US012284411B2

(12) United States Patent
Zhou

(10) Patent No.: US 12,284,411 B2
(45) Date of Patent: Apr. 22, 2025

(54) VIDEO PLAYING METHOD, APPARATUS AND DEVICE IN MAP, COMPUTER-READABLE STORAGE MEDIUM AND COMPUTER PROGRAM PRODUCT

(71) Applicant: Tencent Technology (Shenzhen) Company Limited, Shenzhen (CN)

(72) Inventor: Zhitong Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 15 days.

(21) Appl. No.: 17/992,735

(22) Filed: Nov. 22, 2022

(65) Prior Publication Data

US 2023/0084001 A1 Mar. 16, 2023

Related U.S. Application Data

(63) Continuation of application No. PCT/CN2022/080851, filed on Mar. 15, 2022.

(30) Foreign Application Priority Data

Apr. 12, 2021 (CN) .......................... 202110390275.0

(51) Int. Cl.
*H04N 21/431* (2011.01)
*G06F 3/0481* (2022.01)

(52) U.S. Cl.
CPC ....... *H04N 21/4316* (2013.01); *G06F 3/0481* (2013.01)

(58) Field of Classification Search
CPC .......................... H04N 21/4316; G06F 3/0481
See application file for complete search history.

(56) References Cited

U.S. PATENT DOCUMENTS

| 2004/0009766 A1* | 1/2004 | Hong ............... G08G 1/096775 |
| | | 455/422.1 |
| 2009/0187300 A1* | 7/2009 | Everitt ............... G01C 21/3602 |
| | | 701/119 |
| 2012/0017148 A1 | 1/2012 | Watt et al. |
| | (Continued) | |

FOREIGN PATENT DOCUMENTS

| CN | 104504065 A | 4/2015 |
| CN | 104820603 A | 8/2015 |
| CN | 105608095 A | 5/2016 |

OTHER PUBLICATIONS

Tencent Technology, WO, PCT/CN2022/080851, Jun. 16, 2022, 5 pgs.

(Continued)

*Primary Examiner* — Mulugeta Mengesha
(74) *Attorney, Agent, or Firm* — Morgan, Lewis & Bockius LLP

(57) ABSTRACT

A video playing method includes: transmitting, in response to detecting a user input on a target control in a map display interface, a first acquisition request, the first acquisition request being used for acquiring target video data corresponding to the target control; receiving response information for the first acquisition request, and acquiring the target video data based on the response information; and displaying a video window on the map display interface, the video window being used for playing the target video data.

19 Claims, 11 Drawing Sheets

(56) References Cited

U.S. PATENT DOCUMENTS

2017/0089714 A1* 3/2017 Liu .................. G01S 19/42
2018/0233042 A1* 8/2018 Zhang .............. G08G 1/096791
2019/0087492 A1* 3/2019 Wu .................. G06F 16/29

OTHER PUBLICATIONS

Tencent Technology, IPRP, PCT/CN2022/080851, Oct. 12, 2023, 6 pgs.
Tencent Technology, ISR, PCT/CN2022/080851, Jun. 16, 2022, 2 pgs.

* cited by examiner

VIDEO PLAYING METHOD, APPARATUS AND DEVICE IN MAP, COMPUTER-READABLE STORAGE MEDIUM AND COMPUTER PROGRAM PRODUCT

CROSS-REFERENCE TO RELATED APPLICATIONS

This application is a continuation application of PCT Patent Application No. PCT/CN2022/080851, entitled "VIDEO PLAYBACK METHODS, DEVICES, DEVICES, COMPUTER-READABLE STORAGE MEDIA, AND COMPUTER PROGRAM PRODUCTS IN THE MAP" filed on Mar. 15, 2022, which claims priority to Chinese Patent Application No. 202110390275.0, filed with the State Intellectual Property Office of the People's Republic of China on Apr. 12, 2021, and entitled "VIDEO PLAYBACK METHODS, DEVICES, DEVICES, COMPUTER-READABLE STORAGE MEDIA, AND COMPUTER PROGRAM PRODUCTS IN THE MAP", all of which are incorporated herein by reference in their entirety.

FIELD OF THE TECHNOLOGY

This application relates to an Internet technology, in particular to a video playing method, apparatus, and device in a map, a computer-readable storage medium and a computer program product.

BACKGROUND OF THE DISCLOSURE

At present, electronic maps play an important role in people's travel. The electronic maps are also widely used in various occasions. For example, when using an electronic map for path planning or navigation, when there are events (including but not limited to congestion, construction, traffic accidents and other events) along the road, the electronic map will give corresponding prompts, but existing prompt information has a single form and is not intuitive enough. The technical status quo of the singleness of the information presented by the electronic map for the road affects the timely acquisition of valuable information related to the road based on the electronic map.

SUMMARY

Embodiments of this application provide a video playing method, apparatus, and device in a map a computer readable storage medium and a computer program product in a map, which can enable an electronic map to provide timely and accurate road related information in a variety of information display forms, and provide valuable reference for travel.

The technical solutions of the embodiments of this application are implemented as follows:

An embodiment of this application provides a video playing method on a map, including:
transmitting, in response to detecting a user input on a target control in a map display interface, a first acquisition request, the first acquisition request being used for acquiring target video data corresponding to the target control;
receiving response information for the first acquisition request, and acquiring the target video data based on the response information; and
displaying a video window on the map display interface, the video window being used for playing the target video data.

An embodiment of this application provides a video playing method on a map, including:
receiving a first acquisition request, the first acquisition request being used for acquiring target video data, and the first acquisition request includes location information;
generating verification information in response to the first acquisition request; and
transmitting response information that includes the verification information to a terminal, so that the terminal acquires the target video data based on the verification information.

An embodiment of this application provides a video playing apparatus on a map, including:
a first transmitting module, configured to transmit, in response to an interactive operation of a target control in a map display interface, a first acquisition request, the first acquisition request being used for acquiring target video data, and the target video data corresponding to the target control;
a first acquisition module, configured to receive response information for the first acquisition request, and acquire the target video data based on the response information; and
a first displaying module, configured to display a video window on the map display interface, the video window being used for playing the target video data.

In some embodiments, the first acquisition module is further configured to:
acquire a target video playing address based on the response information; and
acquire the target video data according to the target video playing address.

In some embodiments, the first acquisition module is further configured to:
acquire valid time information of the target video playing address;
determine that the target video playing address is in a valid state based on the valid time information and current time; and
acquire the target video data from the target video playing address.

In some embodiments, the valid time information includes effective time and invalid time, and the first acquisition module is further configured to:
in accordance with a determination that the current time is between the effective time and the invalid time, determine that the target video playing address is in the valid state.

In some embodiments, the first acquisition module is further configured to:
acquire a target storage address included in the response information; and
acquire the target video data from a local storage space of a terminal according to the target storage address.

In some embodiments, the apparatus further includes:
a first loading module, configured to load a first floating layer in a preset region of the map display interface according to a first preset transparency, and present the video window on the first floating layer;
a video playing module, configured to play the target video data in the video window in one of the following ways:

automatically playing the target video data in the video window after displaying the video window:
  playing, in response to a video playing instruction, the target video data in the video window; and
  controlling playing of a target video in the video window according to a network connection state of a terminal, wherein the map display interface runs on the terminal.

In some embodiments, the video playing module is further configured to:
  in accordance with a determination that the terminal is in a WLAN connection state, automatically play the target video data in the video window; or,
  in accordance with a determination that the terminal is in a cellular connection state or switched to the cellular connection state, and a video automatic playing condition is met, automatically play the target video data in the video window; or,
  in accordance with a determination that the terminal is in the cellular connection state or switched to the cellular connection state, and the video automatic playing condition is not met, display first prompt information in the video window, in response to a confirmation operation of the first prompt information, play the target video data in the video window, or close the video window in response to not receiving the confirmation within a specified time.

In some embodiments, the video playing module is further configured to:
  load a second floating layer in the video window according to a second preset transparency; and
  display the first prompt information in the second floating layer, the first prompt information being used for prompting to choose to confirm playing video data or choose not to remind to play the video data within a preset duration, and the second floating layer being provided with a confirmation control for confirming playing and a choose control for not reminding within the preset duration.

In some embodiments, the apparatus further includes:
  a second acquisition module, configured to acquire a target image corresponding to the target control; and
  a second displaying module, configured to display an image window on the map display interface, the image window being used for displaying the target image.

In some embodiments, the apparatus further includes:
  a third acquisition module, configured to acquire a type of the target video data, the type being one of live broadcast data and recorded broadcast data; and
  a third displaying module, configured to display a play controlling control of the target video data according to the type of the target video data.

In some embodiments, the third displaying module is further configured to:
  display, in accordance with a determination that the type is the live broadcast data, a switching key of the target video data, the switching key being used for switching the target video data from a playing state to a paused state, or from the paused state to the playing state; and
  at least display, in accordance with a determination that the type is the recorded broadcast data, a progress bar control of the target video data, the progress bar control being used for controlling a playing progress of the target video data.

In some embodiments, the apparatus further includes:
  a second receiving module, configured to receive a first operation for displaying traffic live; and
  a fourth display module, configured to display a traffic live map in response to the first operation, the traffic live map including at least one control that can respond to the interactive operation, the at least one control corresponding to video data of location points in the traffic live map, and the at least one control including the target control.

In some embodiments, the apparatus further includes:
  a third receiving module, configured to receive a second operation for path planning, and acquiring departure information and destination information based on the second operation;
  a first determining module, configured to determine a travel route by using the departure information and the destination information:
  a fourth acquisition module, configured to acquire, in accordance with a determination that the terminal is in the WLAN connection state, video data corresponding to at least one location point included in the travel route; and
  a storage module, configured to store the video data.

In some embodiments, the apparatus further includes:
  a fifth displaying module, configured to display confirm information and confirmation control corresponding to the target video data in the video window, the confirmation control including a first control for determining that an event corresponding to the target video data exists and a second control for determining that the event corresponding to the target video data does not exist, and the confirm information including first confirm data corresponding to the first control and second confirm data corresponding to the second control;
  a fifth acquisition module, configured to acquire location information of the terminal itself;
  a sixth displaying module, configured to present, in accordance with a determination that the location points corresponding to the location information and the target video data meet a proximity condition, second prompt information for confirming whether the event corresponding to the target video data occurs:
  a first updating module, configured to update, in accordance with a determination that a third operation for the first control is received, the first confirm data based on the third operation; and
  a second updating module, configured to update, in accordance with a determination that a fourth operation for the second control is received, the second confirm data based on the fourth operation.

An embodiment of this application provides a video playing apparatus in a map, including:
  a first receiving module, configured to receive a first acquisition request, the first acquisition request being used for acquiring target video data, and the first acquisition request carrying location information;
  a generating module, configured to generate verification information in response to the first acquisition request; and
  a second transmitting module, configured to transmit response information carrying the verification information to a terminal, so that the terminal acquires the target video data based on the verification information.

In some embodiments, the apparatus further includes:
  a fifth receiving module, configured to receive a second acquisition request of a video playing address transmitted by the terminal, the second acquisition request carrying to-be-verified information corresponding to the verification information and the location information;

a third transmitting module, configured to transmit, in accordance with a determination that the verification information determines that verification of the to-be-verified information has passed, a third acquisition request of the video playing address to a video server; and a sixth receiving module, configured to receive an acquisition response transmitted by the video server, and transmitting the acquisition response to the terminal, the acquisition response carrying the video playing address.

In some embodiments, the apparatus further includes:

a sixth acquisition module, configured to acquire road network data corresponding to an electronic map;

a seventh acquisition module, configured to acquire, in accordance with a determination that a preset event is determined to occur based on the road network data, location information and time information corresponding to the preset event; and a fourth transmitting module, configured to transmit the location information and the time information to the video server, so that the video server acquires video data corresponding to the preset event based on the location information and the time information.

An embodiment of this application provides a video playing device, including:

a memory, configured to store executable instructions; and a processor, configured to implement the method provided in the embodiments of this application when executing the executable instructions stored in the memory.

An embodiment of this application provides a computer-readable storage medium storing executable instructions, the executable instructions, when executed by a processor, causing the processor to perform the method provided in the embodiments of this application.

An embodiment of this application provides a computer program product or a computer program, the computer program product or the computer program including computer instructions, the computer instructions being stored in a computer-readable storage. A processor of a computer device reads the computer instructions from the computer-readable storage medium, and executes the computer instructions, to cause the computer device to perform the video playing method in a map in the embodiment of this application.

This embodiment of this application has the following beneficial effects:

The map display interface can display event interaction controls that represent preset events such as congestion, accident and construction. The event interaction controls may be controls that trigger video viewing. When receiving an interactive operation for one of the event interaction controls (a target control), a first acquisition request used for acquiring target video data is transmitted in response to the interactive operation. When receiving response information for the first acquisition request, the target video data is acquired based on the response information, and a video window is displayed in the map display interface to play the target video data in the video window. In this way, an electronic map can provide timely and accurate road related information in a variety of information display forms, provide valuable reference for travel, and then be able to view the videos corresponding to traffic events such as congestion, accidents and construction through the electronic map, thus improving the richness of information interaction.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

It needs to be illustrated that, In the embodiments of this application, various data information is involved, such as terminal location information, road condition data, video data, etc. When the embodiments of this application are applied to actual products or technologies, a license or consent is required, and the collection, use and processing of relevant data comply with the relevant laws, regulations and standards of relevant countries and regions.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Electronic maps are maps that are stored and consulted in a digital form by utilizing computer technologies.

2) Network live broadcast, collecting information through a signal collection device (audio or video), and then publishing through the network for users to view.

3) Client, software in various forms that presents maps and live broadcast content, such as a map browser, a map app, a map applet, navigation software, a video client, a specified live broadcast client, a social network client, etc., can have versions that adapt to various platforms (such as a computer terminal, a vehicle-mounted terminal, a mobile terminal, etc.).

Figure 1:
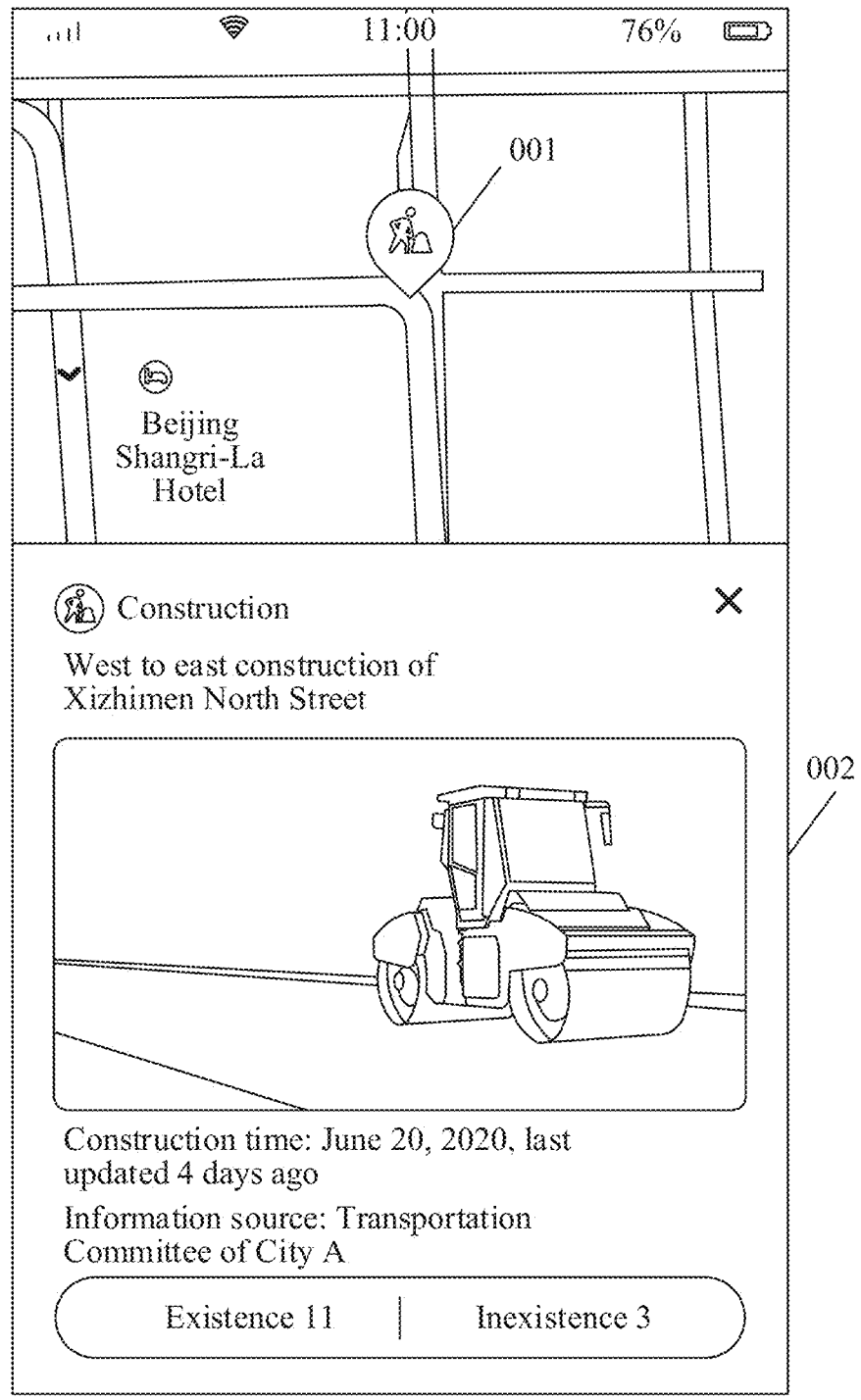
FIG. 1 is a schematic diagram of an interface for displaying event information in the related art.

At present, some electronic maps support the display of icons for events such as congestion, construction, traffic control, etc. When clicking an icon 001 of these events, a page card 002 shown in FIG. 1 can be displayed, in which articles or pictures related to the events can be performed. The displayed pictures are generally preset specific configuration pictures, which cannot acquire real-time pictures or videos of the current location, and the network architecture of the relevant solutions cannot access real-time road condition data services and display on the client.

Based on this, in the embodiments of this application, when a home page of the electronic map and a navigation midpoint event provide data support on a data side, a video playing region is supported to play live data or recorded video data through the video playing region, thereby improving the information richness of the electronic map.

The following describes the exemplary application of the video playing device in a map provided in the embodiments of this application. The device provided in the embodiments of this application may be implemented as various types of terminals such as a notebook computer, a tablet computer, a desktop computer, a set-top box, an in-vehicle equipment or a mobile device (for example, a mobile phone, a portable music player, a personal digital assistant (PDA), a dedicated messaging device, or a portable game device), or may be implemented as a server. An exemplary application that the device when being implemented as a terminal is described in the following.

Figure 2:
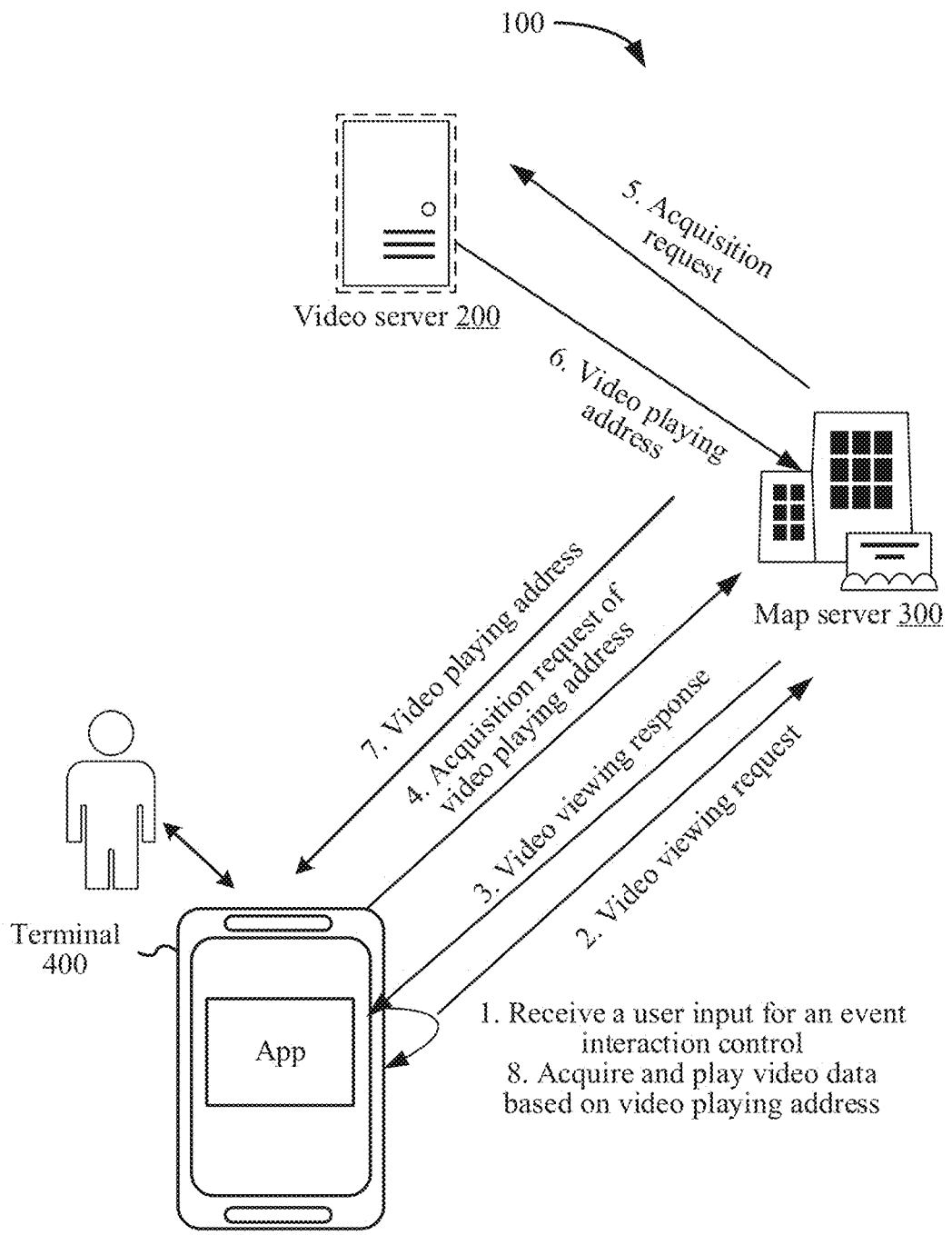
FIG. 2 is a schematic diagram of a network architecture of an information system of an electronic map provided by an embodiment of this application.

Referring to FIG. 2, FIG. 2 is a schematic diagram of a network architecture of a video playing system 100 in a map provided by an embodiment of this application. As shown in FIG. 2, the network architecture includes, a video server 200, a map server 300 and a terminal 400. A communication connection is established between the terminal 400 and the map server 300 and between the map server 300 and the video server 200 through a network (not shown in FIG. 2), and the network may be a wide area network or a local area network, or a combination of the two.

A map client may be installed in the terminal 400, and the map client may be used for travel navigation, route planning, and the like. In the embodiment of this application, when the map client chooses to present a traffic live broadcast map, an event interaction control where a preset event occurs can be displayed at a corresponding location in a display interface of the electronic map. When the terminal receives a touch or click operation for an event interaction control, so as to trigger a viewing request of a video corresponding to the preset event, a target video playing address is acquired from the video server 200 through the map server 300, then corresponding video data is acquired based on the target video playing address, and a video window is presented in a display part of the terminal 400, so that the video data is played in the video window.

The map server 300 may include a map background and a road condition service to acquire road network data through the road condition service. In some embodiments, the network architecture may include a road condition server independent of the map server 3M). The road condition server, the map server 3M), and the video server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data an artificial intelligence platform. The terminal 400 may be a smartphone, a tablet computer, a notebook computer, a desktop computer, a smart speaker, a smartwatch, a smart voice interaction device, a smart household appliance, and a vehicle terminal, but is not limited thereto. The terminal and the server may be directly or indirectly connected in a wired or wireless communication manner. This is not limited in the embodiments of this application.

It needs to be illustrated that, In FIG. 2, the map server 300 and the video server 200 are independent entities. In the actual implementation process, the map server 300 and the video server 200 may be integrated into one server, and at this time, the server can complete the functions of the map server and the video server.

Figure 3A:
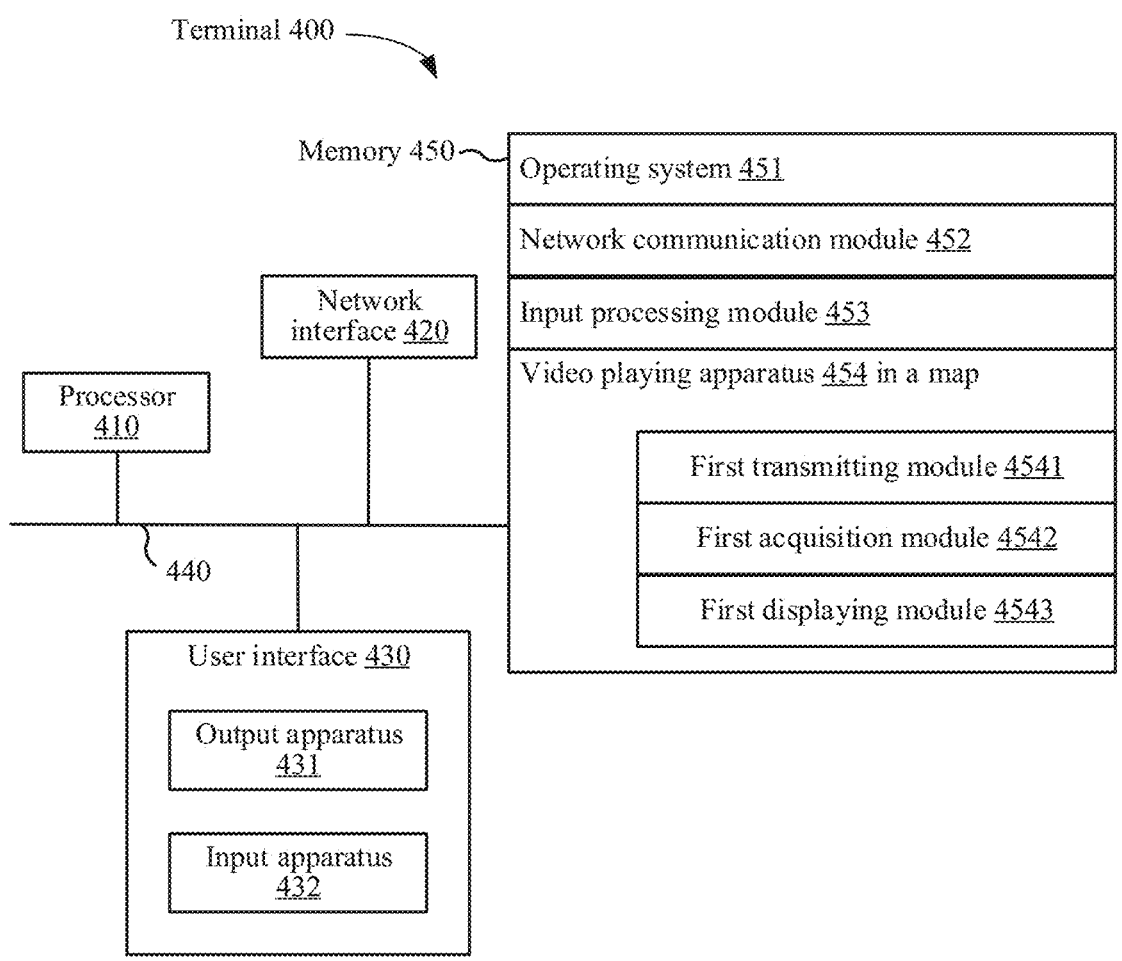
FIG. 3A is a schematic structural diagram of a terminal provided by an embodiment of this application.

Referring to FIG. 3A, FIG. 3A is a schematic structural diagram of a terminal 400 provided by an embodiment of this application, the terminal 400 shown in FIG. 3A includes: at least one processor 410, a memory 450, at least one network interface 420, and a user interface 430. All the components in the terminal 400 are coupled together by a bus system 440. It may be understood that, the bus system 440 is configured to implement connection and communication between the components. In addition to a data bus, the bus system 440 further includes a power bus, a control bus, and a state signal bus. However, for clear description, various types of buses in FIG. 3A are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 includes one or more storage devices away from the processor 410 in a physical position, in some embodiments.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, Wireless Fidelity (WiFi), Universal Serial Bus (USB), etc.

An input processing module 453 is configured to detect one or more user inputs or interactions from one of the one or more input apparatuses 432 and translate the detected input or interaction.

In some embodiments, the apparatus provided in the embodiments of this application may be implemented in the form of software. FIG. 3A shows a video playing apparatus 454 in a map that is stored in the memory 450, which may be software in the form of a program and a plug-in, including the following software modules: The first transmitting module 4541, the first acquisition module 4542 and the first display module 4543 are logical, so they can be combined or further split according to the implemented functions.

The first display module 4543 and other display modules are configured to display information by using an output apparatus 431 (for example, a display screen or a speaker) associated with one or more user interfaces 430 (for example, a user interface configured to operate a peripheral device and display content and information). The following describes functions of the modules.

The video playing method in a map provided in the embodiments of this application is described with reference to an exemplary application and implementation of the terminal provided in this embodiment of this application.

Figure 4:
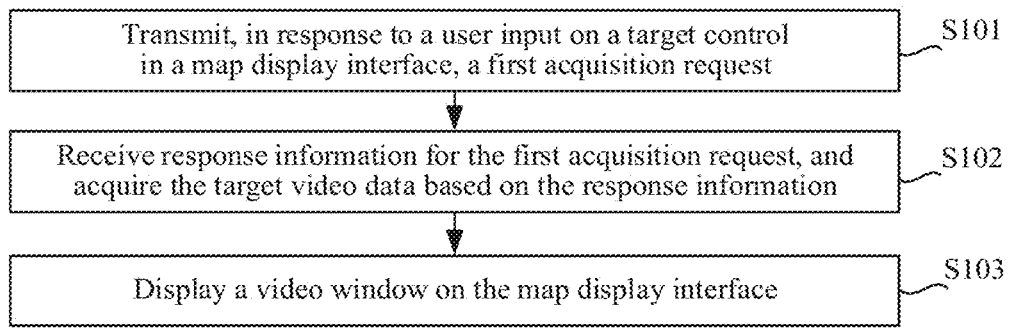
FIG. 4 is an implementation schematic flowchart of a video playing method in a map provided by an embodiment of this application.

A video playing method in a map provided by the embodiment of this application is applied to the terminal shown in FIG. 2. FIG. 4 is an implementation schematic flowchart of a video playing method in a map provided by an embodiment of this application, and the following steps will be described in combination with FIG. 4.

Step S101: Transmit, in response to an interactive operation of a target control in a map display interface, a first acquisition request.

The first acquisition request is used for acquiring target video data, and the target video data corresponds to the target control.

In step S101, a map displayed in the map display interface may be a default map display interface when the map client is started or a map web page is opened through a browser. The default map display interface may display event controls with preset events (for example, it may be a construction event control shown in 001 of FIG. 1), the preset events may be construction, traffic accidents, traffic control, etc., and the preset events may further be real-time road conditions in a key road section. The embodiment of this application does not limit the type of events.

Clicking the event control may present an event information interface, the event information interface presents basic information of the preset event, it may include such as location information, occurrence events, etc. The event information interface may further present an event interaction control, which may be a video playing control.

Figure 10:
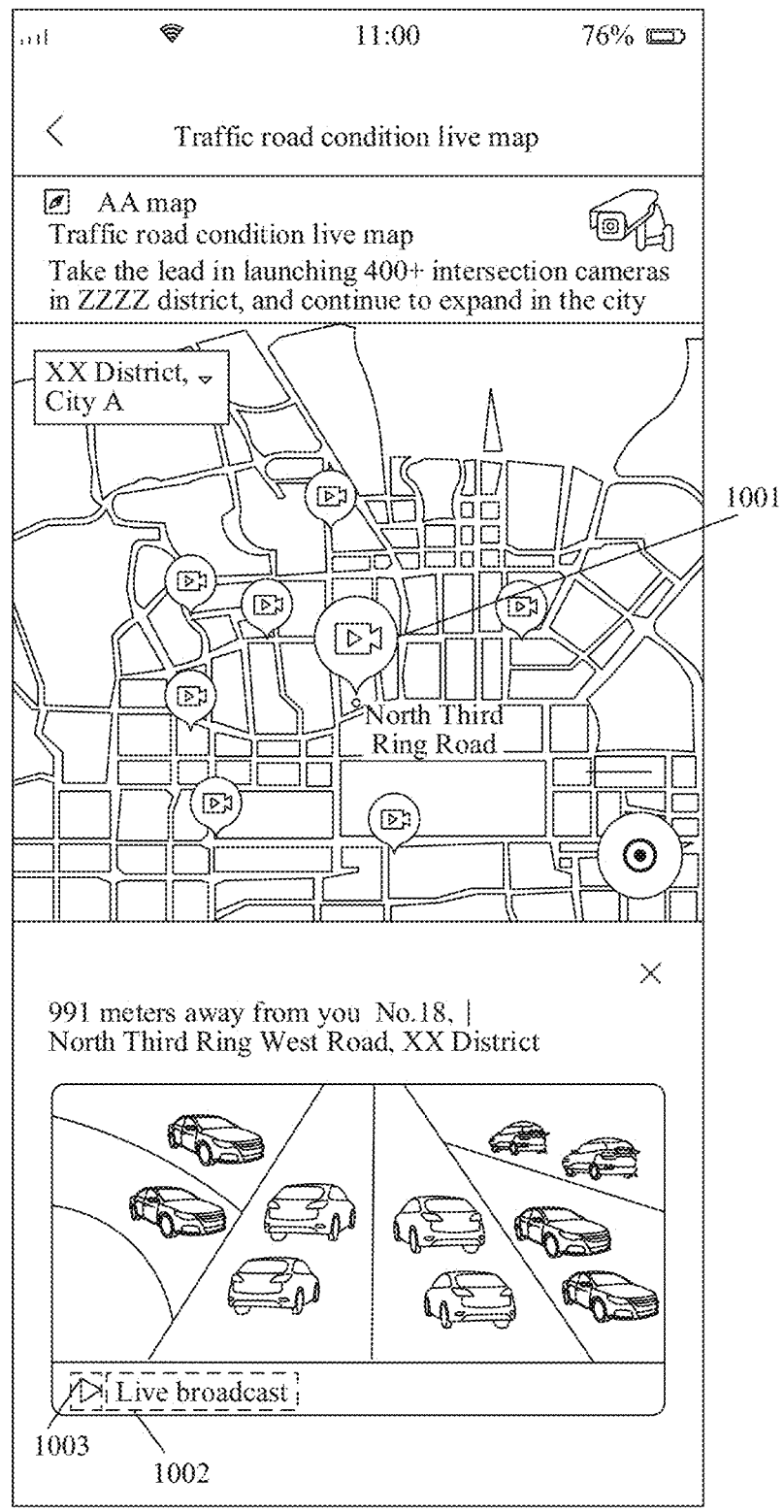
FIG. 10 is a schematic diagram of a display interface of a live traffic live map provided by an embodiment of this application.

In some embodiments, the map display interface may also display a traffic live map presented by a first operation in response to traffic live, the traffic live map includes the event interaction control corresponding to the preset event, and the event interaction control may be the video playing control (for example, may be 1001 shown in FIG. 10).

In the embodiment of this application, the target control is one of the one or more event interaction controls displayed in the map display interface, and the interactive operation for the target control in the map display interface may be the click or touch operation for the target control. The first acquisition request transmitted in response to the interactive operation may be transmitted to the map server, and at this time, the first acquisition request may carry location information corresponding to the target control. When the map server includes a map background service and a road condition service, the road condition service may be used as a service progress of the map server, and at this time, the first acquisition request is transmitted to the map server. Correspondingly, response information is constructed by the map server, and then transmitted to the terminal. When the map server only includes the map background service but not the road condition service, the first acquisition request is transmitted to a road condition server through a map background. Correspondingly, the response information is constructed by the road condition server, and then transmitted to the terminal through the map background service.

In some embodiments, when the terminal locally stores target video data corresponding to the target control, the first acquisition request may be transmitted to a storage device of the terminal itself, so as to request to acquire the target video data from a local storage space of the terminal.

Step S102: Receive response information for the first acquisition request, and acquire the target video data based on the response information.

When the first acquisition request is transmitted to the map server, after the terminal transmits the first acquisition request to the map server, the map server generates a one-time token (also known as a one-time password) based on the first acquisition request, and carries the one-time token as verification information in the response information to return to the terminal, the terminal receives the response information, analyzes the response information to obtain the verification information, and then acquires the target video data based on the verification information. During implementation, the terminal may transmit a second acquisition request of a video playing address to the video server, the second acquisition request may be transmitted to the video server through the map server, then a video playing address returned by the video server is acquired through the map server, and then the target video data is acquired according to the target video playing address.

When the first acquisition request is transmitted to the storage device of the terminal, the response information carries a target storage address, and at this time, the target video data may be acquired based on the target storage address.

Step S103: Display a video window on the map display interface.

The video window is used for playing the target video data. A cover of the target video data is a first frame image by default. During actual implementation, the cover may also be set for the target video data.

When the target video data is acquired, a floating layer may be loaded on the map display interface according to a certain transparency, and the video window is presented on the floating layer, for example, the floating layer may be loaded with a 20% transparency, and the video window is presented on the floating layer. The window size of the video window may be smaller than or equal to the interface size of the map display interface.

In the video playing method in the map provided by the embodiment of this application, when the map display interface may display the event interaction controls with the preset events, the interactive operation for one of the event interaction controls (the target control) may be received, the target control may be a control that triggers video viewing, at this time, the first acquisition request is transmitted in response to the interactive operation, the first acquisition request is used for acquiring the target video data, and the target video data corresponds to the target control; then the response information for the first acquisition request is received, and the target video data is acquired based on the response information; and the video window is displayed on the map display interface, and the video window is used for playing the target video data. In this way, the uses can view the videos corresponding to the traffic events or road condition information such as congestion, accidents and construction in the electronic map, which can not only improve the information supply of the electronic map, but also improve the information interaction richness.

In some embodiments, "acquire the target video data based on the response information" in step S102 shown in FIG. 4 has different implementations based on whether the first acquisition request is transmitted to the map server or the storage device of the terminal itself. When the first acquisition request is transmitted to the map server, the response information carries the verification information, the verification information may be the one-time token, and correspondingly, step S102 may be implemented through the following steps:

Step S1021A: Acquire a target video playing address based on the response information.

In some embodiments, the step may be further implemented through the following steps:

Step S21A1: Transmit a second acquisition request of the video playing address to the video server.

The second acquisition request carries to-be-verified information corresponding to the verification information and location information corresponding to the event interaction control. In some embodiments, during implementation of step S21A1, the terminal transmits the second acquisition request of the video playing address to the map server, then the map server verifies the terminal based on the verification information, and after verification is passed, a third acquisition request is transmitted to the video server. The third acquisition request only carries the location information, and does not need to carry the verification information.

In some embodiments, the third acquisition request further carries time information corresponding to the event interaction control, after receiving the third acquisition request, the video server acquires the video playing address of corresponding video data based on the location information and the time information, and carries the target video playing address in an acquisition response to return to the terminal.

Step S1022: Receive the acquisition response returned by the video server, and acquire the video playing address included in the acquisition response.

When the second acquisition request is transmitted to the video server through the map server, the map server verifies the to-be-verified information based on the verification information to obtain a verification result, when verification is passed, receiving the acquisition response returned by the video server, during implementation, the acquisition response returned by the video server through the map server may be received, that is, the acquisition response is first transmitted to the map server by the video server, and then transmitted to the terminal by the map server.

In some embodiments, if a direct communication connection is established between the terminal and the video server, at this time, the terminal may directly transmit the second acquisition request to the video server, then the video server acquires the verification information from the map server, and verifies the to-be-verified information based on the verification information to obtain the verification result. When the verification is passed, the video server directly returns the acquisition response to the terminal.

In this way, through steps S21A1 to S21A2, the video playing address is acquired based on a video viewing response, so as to provide necessary playing links for subsequent video playing, and ensure normal video playing.

Step S1022A: Acquire the target video data according to the target video playing address.

In the embodiment of this application, the target video playing address is a temporary uniform resource locator (URL) address. In order to prevent hot linking, the video playing address has a valid time. Therefore, during implementation of step S1022A, after acquiring the target video playing address, whether the video playing address is valid may be first determined based on a current moment and the valid time, and when the video playing address is valid, the corresponding target video data is acquired. The target video data may be live broadcast video data or recorded broadcast video data.

Step S1022A may implemented through the following steps:

Step S22A1: Acquire valid time information of the target video playing address.

In the embodiment of this application, in order to prevent video data from being misappropriated by other applications and ensure the timeliness and authenticity of the video data, the valid time information may be set for the video playing address, the valid time information may include effective time and invalid time, for example, the effective time may be 17:00 on Apr. 6, 2021, and the invalid time may be 12:00 on Apr. 7, 2021.

Step S22A2: Determine that the target video playing address is in a valid state based on the valid time information and current time.

The current time is between the effective time and the invalid time, then it is considered that the target video playing address is in the valid state, and at this time, step S22A3 is performed. In some embodiments, if the current time is not between the effective time and the invalid time, it is determined that the target video playing address is in an ineffective state, and at this time, prompt information that the video has expired may be presented.

Step S22A3: Acquire the target video data from the target video playing address.

When the first acquisition request is transmitted to the storage device of the terminal itself, the response information carries a target storage address, and "acquire the target video data based on the response information" in step S102 may be implemented through the following steps:

Step S1021B: Acquire a target storage address included in the response information: and Step S1022B: Acquire the target video data from the local storage space of the terminal according to the target storage address.

In this way, the target video data may be acquired from the local storage space of the terminal, which can not only improve the video playing efficiency, but also reduce the traffic consumption.

In some embodiments, after step S103, the following steps may further be performed:

Step S104: Load a first floating layer in a preset region of the map display interface according to a first preset transparency, and present the video window on the first floating layer.

The preset region of the map display interface may be a partial region of the map display interface, such as the upper half region, the lower half region, and the middle region of the map display interface, and may also be the entire region of the map display interface.

The first preset transparency may be preset values such as 0%, 10%, 25%, etc. When the first preset transparency is 0%, it means that the first floating layer is completely opaque, that is, the first floating layer completely covers a map screen of the preset region in the map display interface.

Step S105: Play the target video data in the video window in one of the following ways:

In a first way, the target video data is automatically played in the video window after displaying the video window.

When the terminal is in a networking state or the target video data is acquired locally from the terminal, the target video data may be automatically played without additional user operation, so that a video playing process can be simplified, and the video playing efficiency can be improved.

In a second way, the target video data is played in the video window in response to a video playing instruction.

In the way, the target video data needs to be played after receiving a clear video playing instruction, which can ensure that the video is played with the user's permission.

In a third way, playing of a target video in the video window is controlled according to a network connection state of the terminal. The map display interface runs on the terminal.

Figure 5:
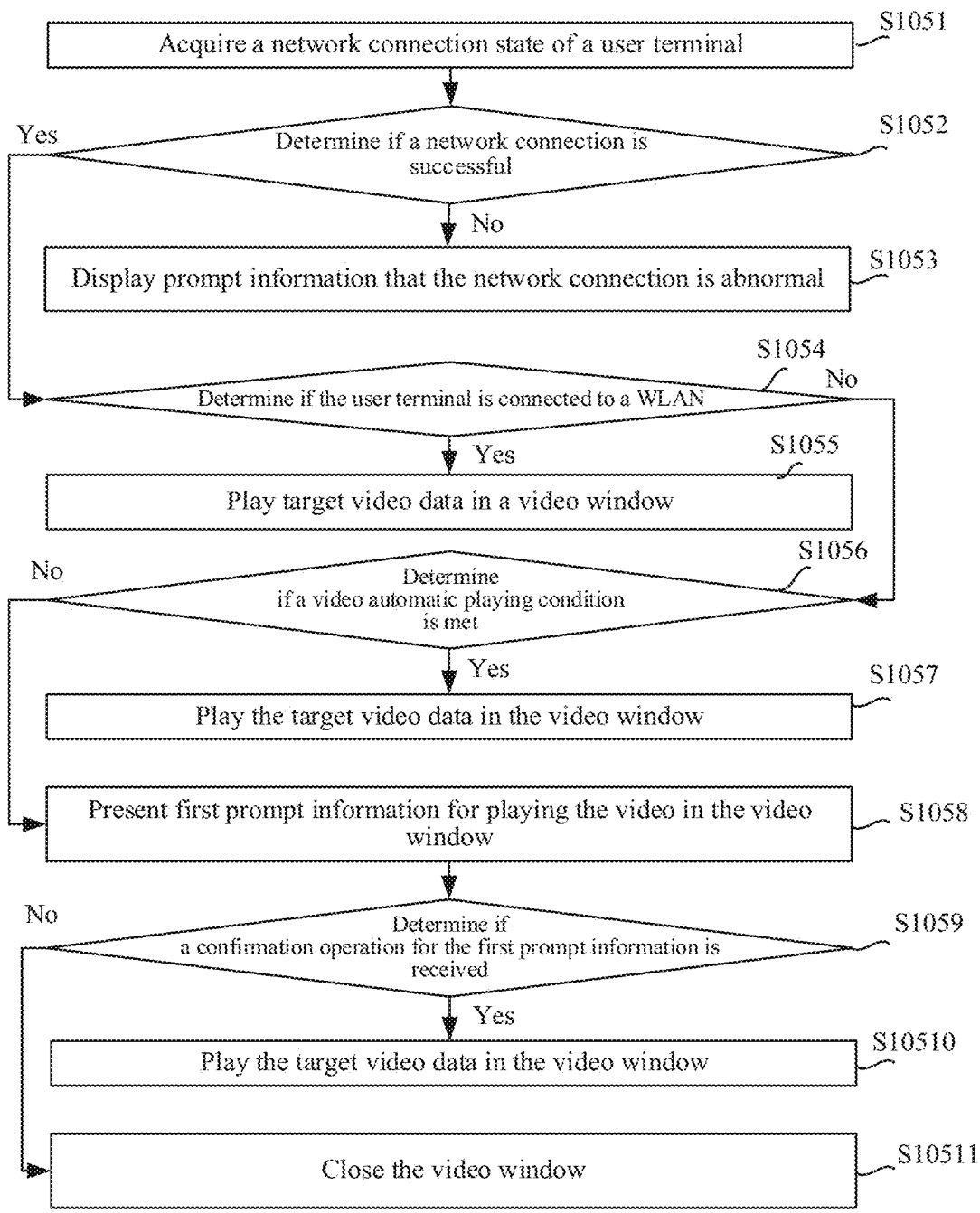
FIG. 5 is an implementation schematic flowchart of playing video data in a video window provided by an embodiment of this application.

During actual implementation, the third way may be implemented through each step shown in FIG. 5. The steps to implement the third way are described below in combination with FIG. 5.

Step S1051: Acquire the network connection state of the terminal.

The network connection state of the terminal may be connected successfully or in failure.

Step S1052: Determine if the network connection state is connected successfully.

Here, if the terminal is under the conditions of no network, network interruption, network anomaly, etc., the network connection state is connected in failure, and at this time, step S1053 is performed: and if the network connection state is connected successfully, step S1054 is performed.

Step S1053: Output third prompt information that the network connection state is abnormal.

Step S1054: Determine if the terminal is in a WLAN connection state.

When the network connection state is connected successfully, the terminal may be in a WLAN connection state or a cellular network connection state. In the WLAN connection state, the terminal will not incur related charges due to additional mobile traffic, while in the cellular network connection state, the terminal will incur related charges due to the mobile traffic. Therefore, in this step, it is necessary to determine which network connection state the user is in, so as to perform corresponding processing processes. When it is determined that it is in the WLAN connection state, step S1055 is performed; and when it is determined that it is in the cellular connection state, step S1056 is performed.

Step S1055: Automatically play the target video data in the video window.

In the embodiment of this application, when the terminal is in the WLAN connection state, video data is directly played in the video window.

Step S1056: Determine whether a video automatic playing condition is met.

Determining whether the video automatic playing condition is met may be to determine whether an "operator network automatic playing" function is enabled and within a range of "no more reminders in 7 days". When the "operator network automatic playing" is enabled and within the range of "no more reminders in 7 days", it is determined that the video automatic playing condition is met, and at this time, step S1057 is performed; and when it is determined that "operator network automatic playing" is not enabled and not within the range of "no more reminders in 7 days", it is determined that the video automatic playing condition is not met, and at this time, step S1058 is performed.

Step S1057: Automatically play the target video data in the video window.

In some embodiments, a third floating layer may be loaded according to a third transparency when the target video data is played, prompt information that "playing using mobile flow" is outputted in the third floating layer, after the prompt information is presented for a certain duration, loading of the third floating layer is canceled, and the target video data is continuously played.

Step S1058; Present first prompt information for playing the video in the video window.

During implementation of step S1058, a second floating layer may be first loaded in the video window according to a second preset transparency; and then the first prompt information is displayed in the second floating layer. The first prompt information is used for prompting to choose to confirm playing video data or choose not to remind to play the video data within a preset duration, and the second floating layer is provided with a confirmation control for confirming playing and a choose control for not reminding within the preset duration.

Step S1059: Determine if a confirmation operation for the first prompt information is received.

The confirmation operation may be clicking or touching the confirmation control, and when the confirmation operation for the first prompt information is received, step S10510 is performed; and when the confirmation operation of clicking or touching the confirmation control is not received within a specified time, it is determined that the confirmation operation is not received. In some embodiments, a cancel control for canceling playing may further be presented in the second floating layer, and when a clicking or touching operation for the cancel control is received, it is determined that the confirmation operation is not received. In the embodiment of this application, when the confirmation operation is not received, step S10511 is performed.

Step S10510: Play the target video data in the video window.

During implementation of the step, it is similar to step S1057, the third floating layer is loaded according to the third transparency when the target video data is played, the prompt information that "playing using mobile flow" is outputted in the third floating layer, after the prompt information is presented for a certain duration, loading of the third floating layer is canceled, and the target video data is continuously played.

Step S10511: Close the video window.

The video window is closed, that is, loading of the first floating layer is canceled, and at this time, the electronic map is normally displayed.

In some embodiments, after closing the video window, the terminal may further acquire a target image corresponding to the target control; and an image window is displayed on the map display interface, and the target image is displayed in the image window. In this way, the mobile traffic consumption of the terminal can be reduced, and the user can know the event information in time.

In the embodiments of steps S1051 to S10511, when the target video data is played in the video window, first the first floating layer may be loaded according to a certain transparency, so as to present the video window in the first floating layer. When the video data is presented, different implementations may be performed based on the network connection state of the terminal, further, when the network connection state is connected in failure, the prompt information that the network connection state is abnormal may be outputted: when the network connection state is connected successfully, the network connection type may be further determined, for example, when being the WLAN connection state, the target video data is directly played; when being the cellular network connection state, whether the video automatic playing condition is met may be further judged, and when the video automatic playing condition is met, the target video data may be directly played; and when the automatic playing condition is not met, the user may be prompted whether to continue playing the video, and when receiving the confirmation operation of continuing playing, the target video data is played through the video window. In this way, different processing processes are performed for different network connection types, the smoothness of video playing in wireless network connection can be ensured, it can be further ensured that the video playing in the cellular network is performed with the users knowledge and permission, and the transparency of information interaction is improved.

In some embodiments, the video window is displayed, or during or after the target video data is played in the video window, the following steps may further be performed:

Step S201: Acquire a type of the target video data.

The type is one of live broadcast data and recorded broadcast data. When the type is the live broadcast type, it means that the target video data is collected in real time by a video collection device at a location where the preset event occurs and uploaded to the video server; and when the type is the recorded broadcast type, it means that the target video data is collected by the video collection device at the location where the preset event occurs and updated to the video server within a certain duration before the current time.

In some embodiments, the type may be presented in the video window while playing the target video data. For example, the data type may be presented at an edge of the video screen in the video window. For example, "live broadcast" or "recorded broadcast" may be displayed in the upper right corner, upper left corner, lower right corner and other regions of the video screen, taking FIG. 10 as an example, "live broadcast" is displayed in the lower left corner region 1002 of the video screen, it is indicated that the type of the target video data currently played is the live broadcast type.

Step S202: Display a play controlling control of the target video data according to the type of the target video data.

During implementation, when the type is the live broadcast data, the play controlling control includes a switching key. During implementation of displaying the play controlling control of the target video data, namely displaying the switching key of the target video data, the switching key is used for switching the target video data from a playing state to a paused state, or from the paused state to the playing state, and when the type is the recorded broadcast data, the play controlling control includes a progress bar control. During implementation of displaying the play controlling control of the target video data, namely displaying the progress bar control of the target video data, the progress bar control is used for controlling a playing progress of the target video data. During actual implementation, when the type is the recorded broadcast data, the play controlling control not only the progress bar control, but also the switching key.

In some embodiments, when the type is the recorded broadcast data, the playing progress may be adjusted through the following steps:

Step S301: Receive a moving operation for the progress bar control, and determine a target playing progress corresponding to the moving operation.

The moving operation may be an operation of dragging the progress bar control, during implementation of determining the target playing progress corresponding to the moving operation, a moving distance of the moving operation may be acquired, a moving duration is determined based on the moving distance and a total video duration, and then the target playing progress is determined according to a current playing progress and the moving duration.

Step S302: Present video data corresponding to the target playing progress in the video window.

The target playing progress may be a target playing time point, during implementation of presenting the video data corresponding to the target playing progress, the video data may be continuously played from the target playing time point.

In some embodiments, when the user opens the map for path planning, the video may be downloaded or cached through the following steps:

Step S401: Receive a second operation for path planning, and acquire departure information and destination information based on the second operation.

Step S402: Determine a travel route by using the departure information and the destination information.

Step S403: Acquire, in accordance with a determination that the terminal is in the WLAN connection state, video data corresponding to at least one location point included in the travel route.

Step S403: Store the video data.

In the embodiments of steps S401 to S403, when the terminal is in the WLAN connection state, the video data corresponding to the at least one location point included in the travel route may be downloaded to the local of the mobile terminal in advance and stored in the local storage space of the terminal. In this way, the users can acquire the video data directly from the local storage space of the terminal when video playing needs to be performed in the map, the video playing efficiency is improved, and traffic consumption is reduced.

Figure 6:
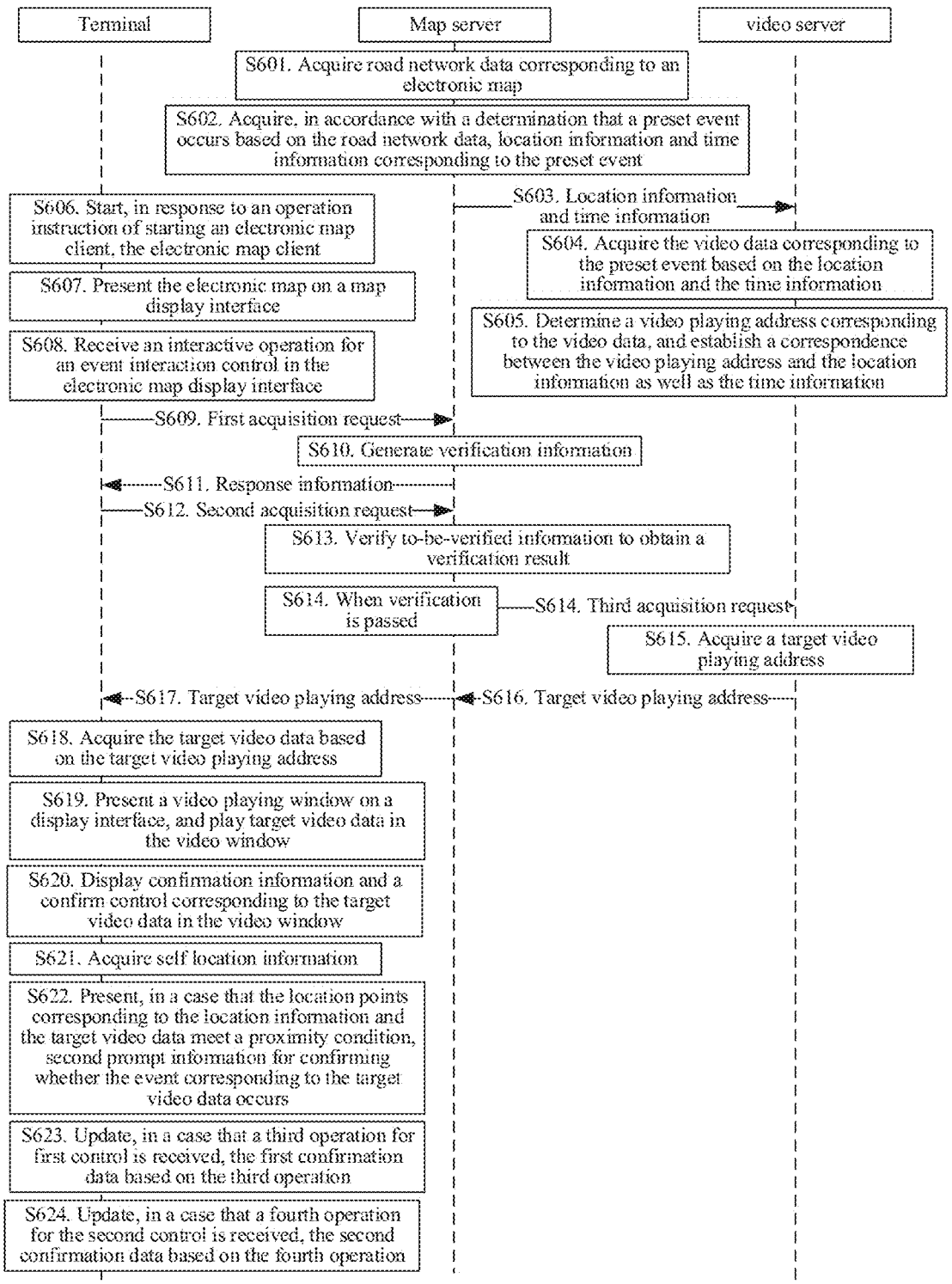
FIG. 6 is another implementation schematic flowchart of a video playing method in a map provided by an embodiment of this application.

Based on the above embodiments, a video playing method in a map provided by the embodiment of this application is applied to the network architecture shown in FIG. 2. FIG. 6 is an implementation schematic flowchart of a video playing method in a map provided by an embodiment of this application, and as shown in FIG. 6, the flow includes the following steps:

Step S601, acquire, by a map server, road network data corresponding to an electronic map.

During implementation of step S601, the road network data corresponding to the electronic map may be acquired from a road network service, and the road network service may be a service progress of the map server itself, or other servers independent of the map server. The road network data may be real-time road network data, or historical road network data within a certain duration from the current moment.

Step S602: Acquire, in accordance with a determination that a preset event is determined to occur based on the road network data, location information and time information corresponding to the preset event by the map server.

During implementation, the map server determines whether the preset event such as congestion, traffic accident and traffic control occurs based on the road network data, and acquires, in accordance with a determination that the preset event is determined to occur, the location information and the time information corresponding to the preset event. The location information may be longitude and latitude information, and the time information may be a moment that the preset event is determined to occur.

Step S603: Transmit, by the map server, the location information and the time information to the video server.

The map server transmits the location information and the time information to the video server, so that the video server acquires corresponding video data based on the location information and the time information.

Step S604: Acquire, by the video server, the video data corresponding to the preset event based on the location information and the time information.

If a time interval between the time information and the current moment is smaller than an interval threshold, during implementation of step S604, the video server may acquire device information of an image collection device corresponding to the location information based on the location information, and acquire video data collected in real time by the corresponding image collection device based on the device information. If the time interval between the time information and the current moment is greater than or equal to the interval threshold, the video data corresponding to the time information collected by the image collection device may be acquired.

Step S605: Determine, by the video server, a video playing address corresponding to the video data, and establish a correspondence between the video playing address and the location information as well as the time information.

Step S606. Start, in response to an operation instruction of starting an electronic map client, the electronic map client by the terminal.

In some embodiments, the terminal may further acquire electronic map data based on a web page address in response to an operation instruction of opening an electronic map web page.

Step S607: Present, by the terminal, an electronic map on the map display interface.

In this step, the presented electronic map may be an electronic map of a default theme. For example, a 2D plane map is presented every time it is opened, or it may be the map used when the electronic map client is closed last time, for example, a traffic live map is used when the electronic map client is closed last time, and then the traffic live map is still presented when it is opened again.

In some embodiments, when the map displayed on the map display interface is not the traffic live map, the traffic live map may be displayed through the following steps:

Step S501: Receive a first operation for displaying traffic live. The first operation may be clicking a button control 901 of "traffic road condition live map" shown in FIG. 9.

Step S502: Display the traffic live map in response to the first operation, the traffic live map including at least one control that can respond to the interactive operation, the at least one control corresponding to video data of location points in the traffic live map, and the at least one control including the target control.

Step S608: Receive, by the terminal, an interactive operation of the target control in the map display interface.

Step S609: Transmit, by the terminal, a first acquisition request to a map server in response to the interactive operation.

The first acquisition request may carry location information corresponding to an event interaction control, and may further carry an event identification.

Step S610: Generate, by the map server, verification information in response to the first acquisition request.

The verification information may be a one-time password, or become a one-time token or a dynamic password. The dynamic password is an authentication technology that uses a password technology to share secrets between a client and a server. It is a strong authentication technology, a very convenient technical means to enhance current static password authentication, and an important two-factor authentication technology.

Step S611: Transmit, by the map server, response information carrying the verification information to the terminal, so that the terminal acquires target playing data based on the verification information.

Step S612: Transmit, by the terminal, a second acquisition request of a video playing address to the map server.

The second acquisition request carries to-be-verified information, and may further carry location information and an event identification corresponding to the target control.

Step S613: Verify, by the map server, the to-be-verified information to obtain a verification result.

During implementation, the to-be-verified information transmitted by the terminal may be verified by using the verification information transmitted to the terminal, when the two are consistent, the verification result of passing verification is obtained, and when the two are inconsistent, the verification result of verification failure is obtained. When the verification fails, the following steps may not be performed, and the map server may return a notification message that acquisition of the video playing address fails to the terminal.

Step S614: When the verification is passed, the map server transmits a third acquisition request of the video playing address to the video server.

The third acquisition request transmitted by the map server to the video server may carry location information and an event identification corresponding to an event interaction control.

Step S615: Acquire, by the video server, a target video playing address.

During implementation, the video server acquires the target video playing address based on the event identification and the location information included in the acquisition request.

Step S616: Transmit, by the video server, the target video playing address to the map server.

Step S617: Transmit, by the map server, the target video playing address to the terminal.

Step S618: Acquire, by the terminal, the target video data based on the target video playing address.

Step S619: Present, by the terminal, a video window on a display interface, and play the target video data in the video window.

Step S620: Display, by the terminal, confirm information and a confirmation control corresponding to the target video data in the video window.

The confirmation control includes a first control for determining that an event corresponding to the target video data exists and a second control for determining that the event corresponding to the target video data does not exist, and the confirm information includes first confirm data corresponding to the first control and second confirm data corresponding to the second control.

The first confirm data may be the number of people who click the first control, that is, the first confirm data can reflect the number of people who confirm the occurrence of the corresponding event in the target video data, for example, the first confirm data is 20, indicating that 20 users pass through a location point corresponding to the target video data and confirm that the video is true; and the second confirm data may be the number of people who click the second control, which can reflect the number of people who confirm no occurrence of the corresponding event in the target video data.

By displaying the confirmation control and the confirm information, the users can intuitively understand the authenticity of the video.

Step S621: Acquire, by the terminal, self-location information.

During implementation, when the terminal starts an automatic position acquisition function or a GPS function, the self-location information can be acquired, and the location information may also be longitude and latitude information.

Step S622: Present, in accordance with a determination that location points corresponding to the location information and the target video data meet a proximity condition, second prompt information for confirming whether the event corresponding to the target video data occurs.

Before step S622, it can be determined if the location information of the terminal and the location points corresponding to the video data meet the proximity condition, and since the location information may be represented by the longitude and latitude information, during implementation, a distance between the terminal and the location point corresponding to the target video data may be determined based on the longitude and latitude information of two location points. When the distance is smaller than a preset distance threshold, such as smaller than 50 meters, it is determined that the proximity condition is met, and at this time, second prompt information for confirming whether the event corresponding to the target video data occurs is presented.

Step S623: Update, in accordance with a determination that a third operation for the first control is received by the terminal, the first confirm data based on the third operation.

The third operation may be an operation of touching or clicking a display region corresponding to the first control, and when the third operation is received, the first confirm data that confirms the occurrence of the event is added by 1.

Step S624: Update, in accordance with a determination that a fourth operation for the second control is received by the terminal, the second confirm data based on the fourth operation.

The fourth operation may be an operation of touching or clicking a display region corresponding to the second control, and when the fourth operation is received, the second confirm data that confirms no occurrence of the event is added by 1.

Since the confirm information and the confirmation control of the target video data may be displayed in the video window, in order to prevent the users from clicking the confirmation control at will, the confirmation control may be enabled when it is determined that the location information of the terminal and the location point corresponding to the target video data meet the proximity condition, and the confirmation control may not be enabled when the proximity condition is not met.

In the video playing method in the map provided by the embodiments of this application, after determining that the preset event occurs based on the acquired road network data, the map server requests the video server to determine the video data corresponding to the preset event, and create the correspondence between the video data and the location information as well as the time information. After that, when the terminal starts the electronic map client or opens the electronic map web page, and triggers the interactive operation for the event interaction control, the terminal transmits the first acquisition request to the map server, then the map server returns the verification information to the terminal, and when the terminal transmits the second acquisition request of the video playing address based on the verification information, it is transmitted to the video server through the map server, after acquiring the video playing address, the terminal loads the video window, and the video screen is played in the video window. In this way, the users can know the progress of the preset events in time, the interaction richness is improved, when the terminal is determined to be close to the location where the preset events occur, the first control and the second control that confirm whether the preset events occur can be enabled, and the confirm information of the preset events is updated based on the operation for the controls, so that the authenticity of the preset events is ensured.

The following describes an exemplary application of this embodiment of this application in an actual application scenario.

In the video playing method in the map provided by the embodiments of this application, general road electronic eye data accessed through a smart transportation basic service and video live broadcast device data of the same function support viewing a current real-time live broadcast video or recorded video for points events such as congestion, accidents, and road closure in a home page point event road conditions of the map client.

Figure 7:
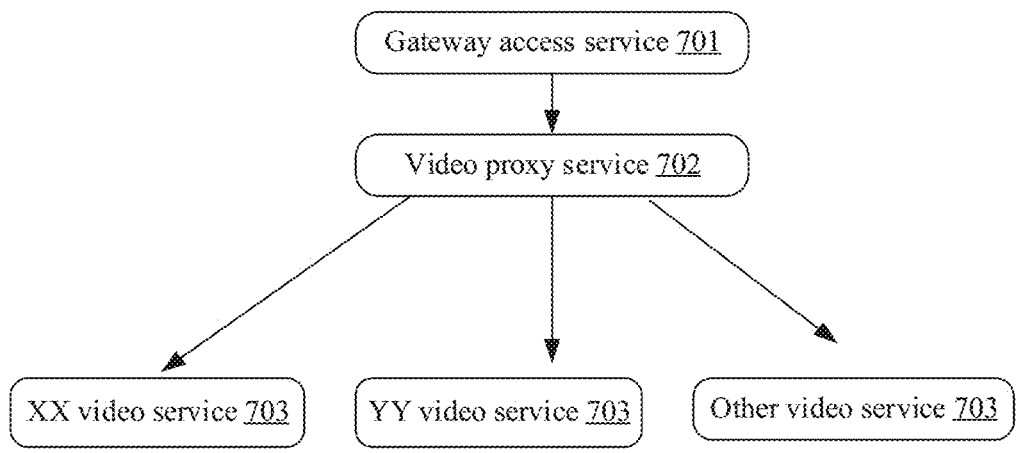
FIG. 7 is a schematic diagram of a network architecture of a network management access service and a video provider provided by an embodiment of this application.

In the embodiment of this application, since there may be a plurality of video providers, a video proxy service is needed to provide a transit service. As shown in FIG. 7, a network management access service 701 accesses a plurality of video providers 703 through a video proxy service 702, and the video providers 703 provide a temporary playing address with timeliness through an interface to ensure the exclusive effectiveness of the video.

In the embodiment of this application, the video proxy service 702 can efficiently access different video providers, the map client can use the live broadcast data of subsequent data sources without awareness, and interface fields of a video proxy service request may be:

```
Struct VideoProxyReq {
0 require string traceid;           // tracking usage
1 require string traceid;           // tracking usage
2 require int type;                 // 0 video 1 live broadcast
3 require string url;               // video address
4 require string video_source;      // video source, used to distinguish which video party
5 require string source;            // request source, used to distinguish callers such as car couplets and hand maps: qqmap_app, carmap
};
// video proxy return
Struct VideoProxyRsp {
0 require int ret_code;             // result return code 0 correct-1 wrong
1 require string ret_msg;           // result return information
2 require string url;               // return valid playing address
};
```

Figure 8:
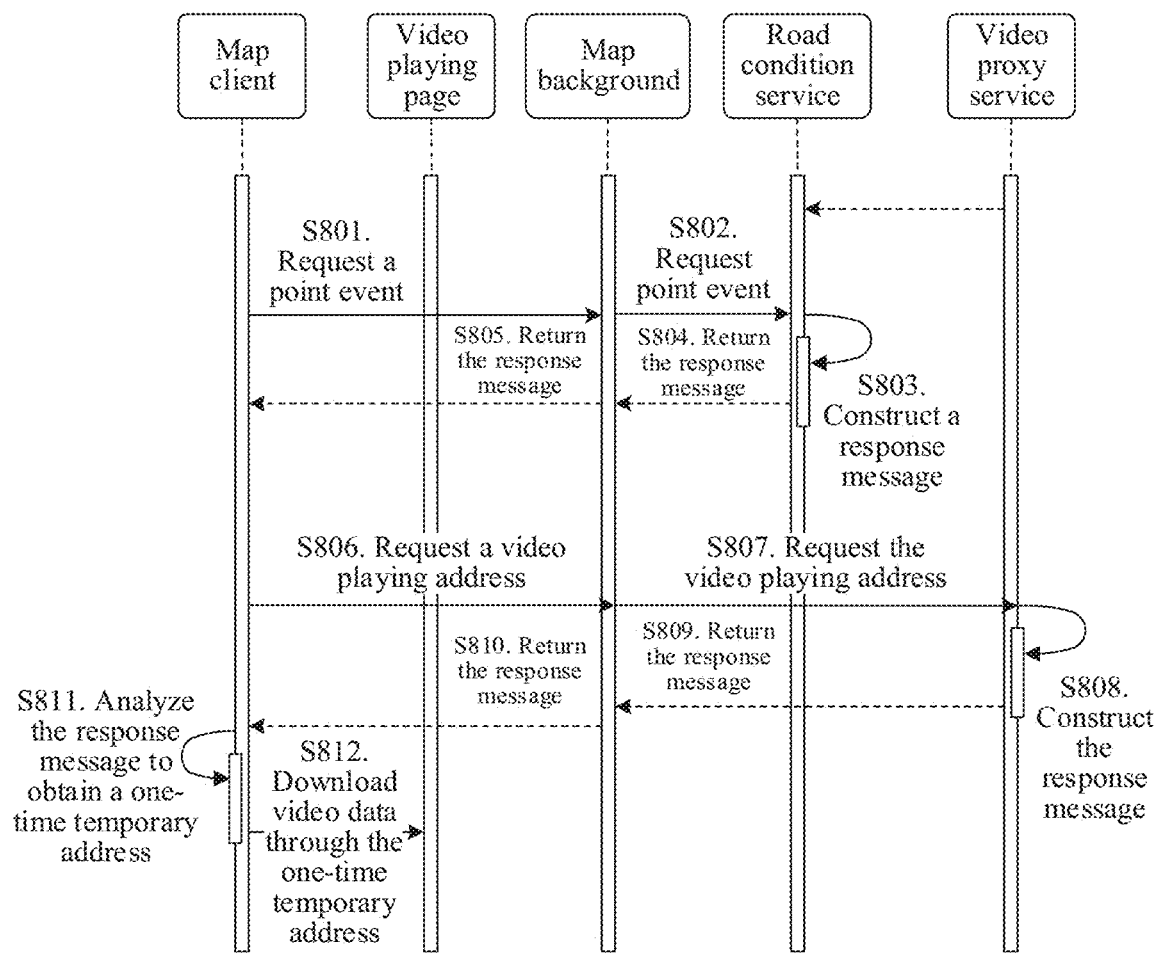
FIG. 8 is an implementation sequence diagram of a video playing method in a map provided by an embodiment of this application.

FIG. 8 is an implementation sequence diagram of a video playing method in a map provided by an embodiment of this application. As shown in FIG. 8, the sequence process includes the following steps:

Step S801: Request, by a map client, a map background based on a triggered point event.

Step S802: Request, by the map background, a road condition service.

Step S803: Construct, by the road condition service, a response message.

During implementation of this step, the road condition service takes a one-time token as the response message requested by the point event.

Step S804: Return, by the road condition service, the response message carrying the one-time token to the map background.

Step S805: Return, by the map background, the response message to the map client.

Step S806: Request, by the map client, a video playing address to the map background based on the one-time token.

Step S807: Transmit, by the map background, a request message for acquiring the video playing address to a video proxy service.

Step S808: Construct, by the video proxy service, the response message.

During actual implementation, the video proxy service takes a one-time temporary address as the response message corresponding to the request message for acquiring the video playing address.

Step S809: Return, by the video proxy service, the response message carrying the one-time temporary address to the map background.

Step S810: Return, by the map background, the response message to the map client.

Step S811: Analyze, by the map client, the response message to obtain the one-time temporary address.

In order to prevent data hot linking, the one-time temporary address has invalid time.

Step S812: Download, by the map client, video data through the one-time temporary address.

In the process of actual application, when it is determined that the one-time temporary address is not invalid based on the invalid time of the one-time temporary address and the current time, the video data may be downloaded through the one-time temporary address, and the downloaded video data may be played on a video playing page.

Figure 9:
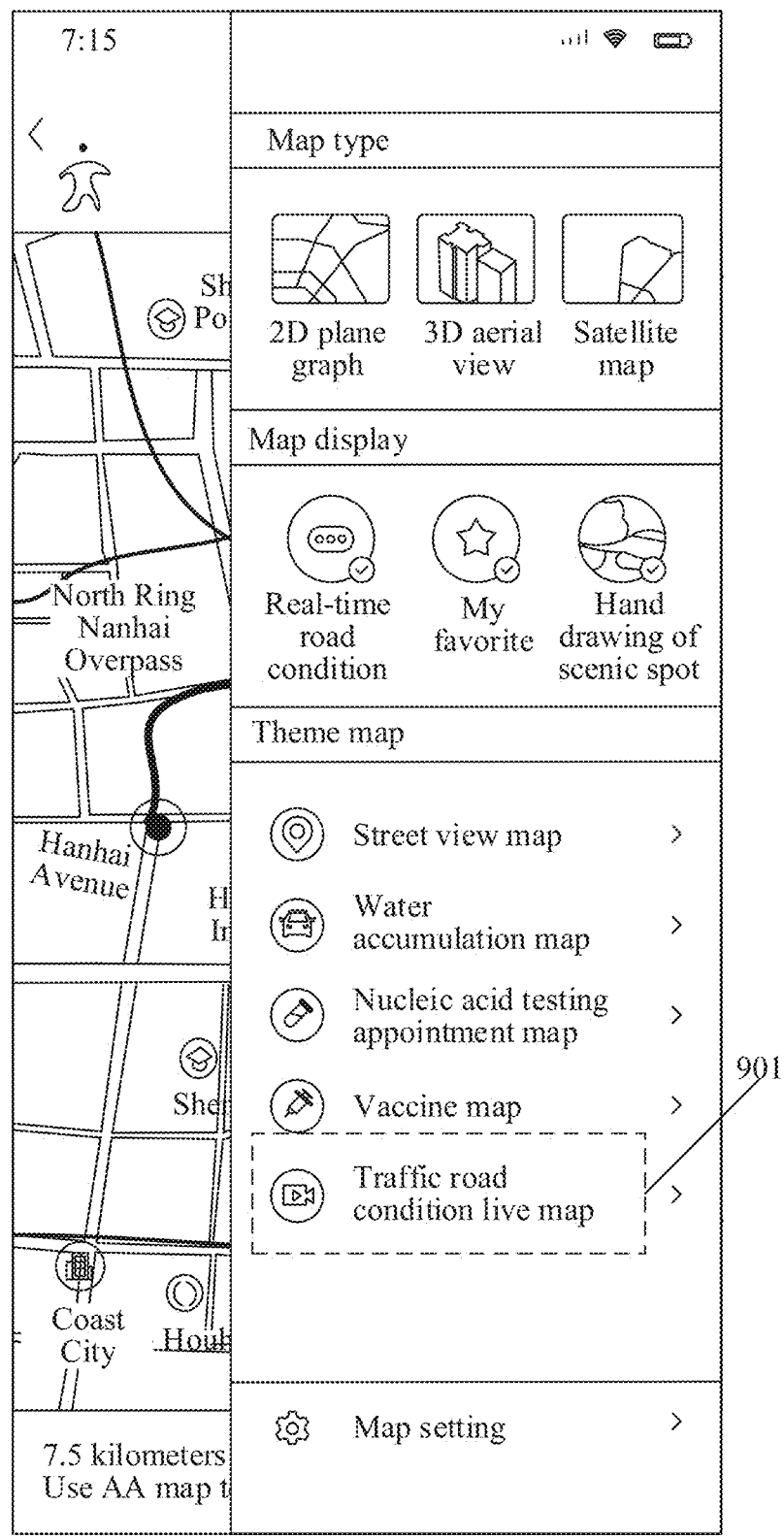
FIG. 9 is a schematic diagram of a navigation page for entering a live traffic live map provided by an embodiment of this application.

In the embodiment of this application, when clicking a button control 901 of "traffic road condition live map" shown in FIG. 9, a traffic road condition live map may be displayed. In the traffic road condition live map, if a location is the location where a point event occurs, a point event video identification 1001 shown in FIG. 10 may be display at this time. When clicking a point event video identification, a video playing region newly added in the map client may be presented, and FIG. 10 is taken as an example for illustration. When clicking the point event video identification 1001 corresponding to the Middle North Third Ring Road, the video playing region may be displayed on a display interface, so as to support playing of the video or a live broadcast media.

Figure 11:
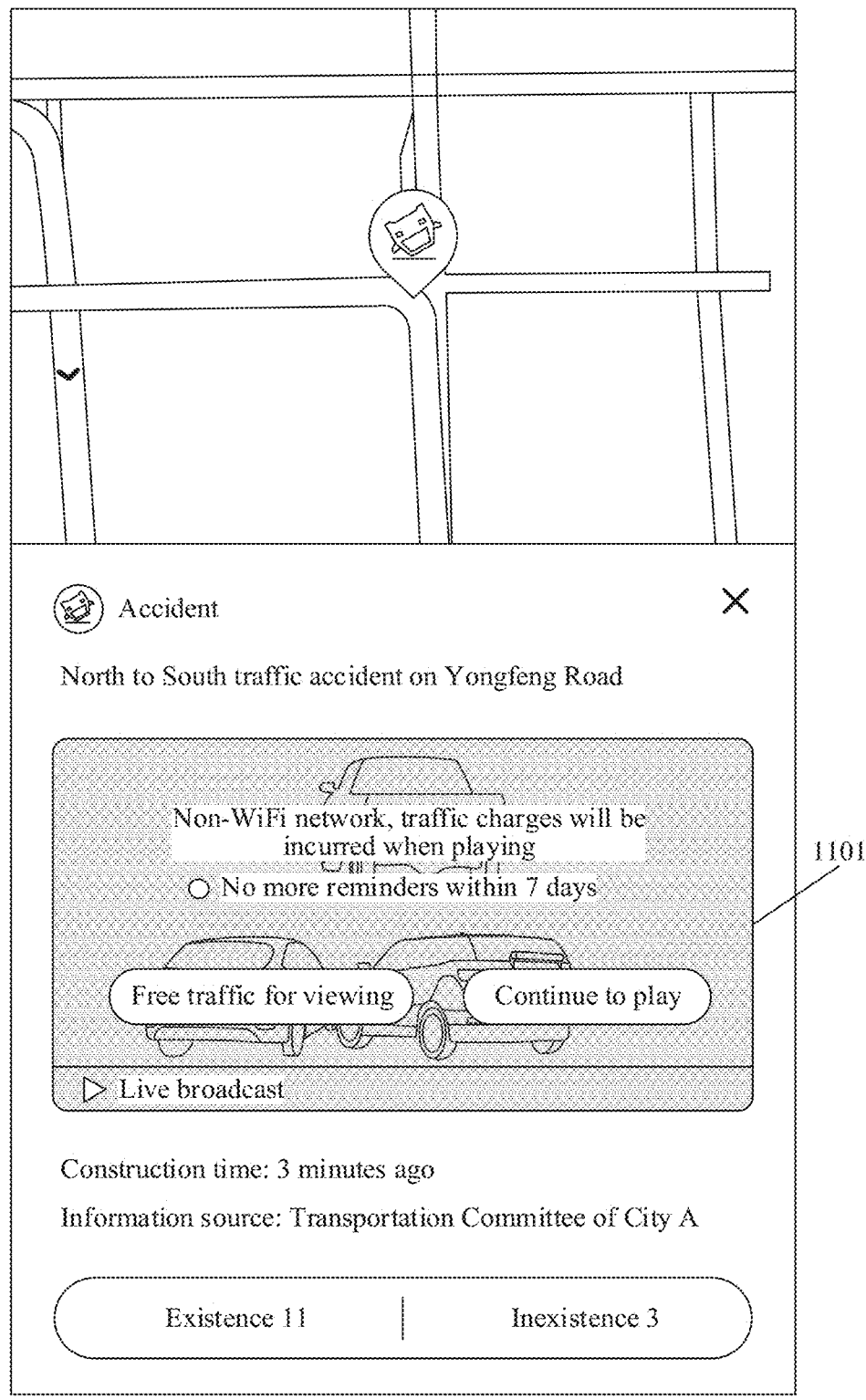
FIG. 11 is a schematic diagram of an interface for playing a video under a mobile network provided by an embodiment of this application.

After the map client receives the video playing address, the playing state of the video may be adjusted according to the network type of the map client. The video is automatically played without prompt information when being in a WiFi connection. Whether a video automatic playing condition is met may be determined when being in or switched to a mobile network, and whether an "operator network automatic playing" function is enabled and within a range of "no more reminders in 7 days" may be determined. When the "operator network automatic playing" is enabled and within the range of "no more reminders in 7 days", a floating layer may be loaded, and the prompt information is outputted in the floating layer: "a non-WiFi network is being used, and traffic charges will be incurred when playing", the video data is normally played, and the prompt information disappears after 3 seconds. When the "operator network automatic playing" is closed or not within the range of "no more reminders in 7 days", a floating layer 1101 may be loaded as shown in FIG. 11, and prompt information is outputted in the floating layer: "a non-WiFi network is being used, and traffic charges will be incurred when playing", at this time, a reminder setting button and a continue playing button are further presented in the floating layer, for example, it may be a choose control of "no more reminders in 7 days", which is unchecked by default, after checking, if the user clicks the button control of "continue playing", the prompt information that "a non-WiFi network is being used, and traffic charges will be incurred when playing" is outputted, the video data is normally played, the prompt information disappears after 3 seconds, and the prompt floating layer will not be presented within 7 days after checking "no more reminders in 7 days".

When the network state of the map client is abnormal connection, network interruption and no network, a message prompt box (toast) pops up, saying "the current network is not good, please check the network settings", and appears after 3 seconds.

During video playing, the video data type may be displayed in the video window, and if the video data is live broadcast data, a "live broadcast" label may be outputted in the lower left corner of the video region; and if the video data is a recorded video clip, a "recorded broadcast" label may be outputted, as shown in FIG. 10, "live broadcast" is displayed in the region 1002 at the lower left corner of the video region. In addition, a cover image of the video is the first frame of the video by default, and if there is no first frame, it is a default image corresponding to the point event.

Figure 12:
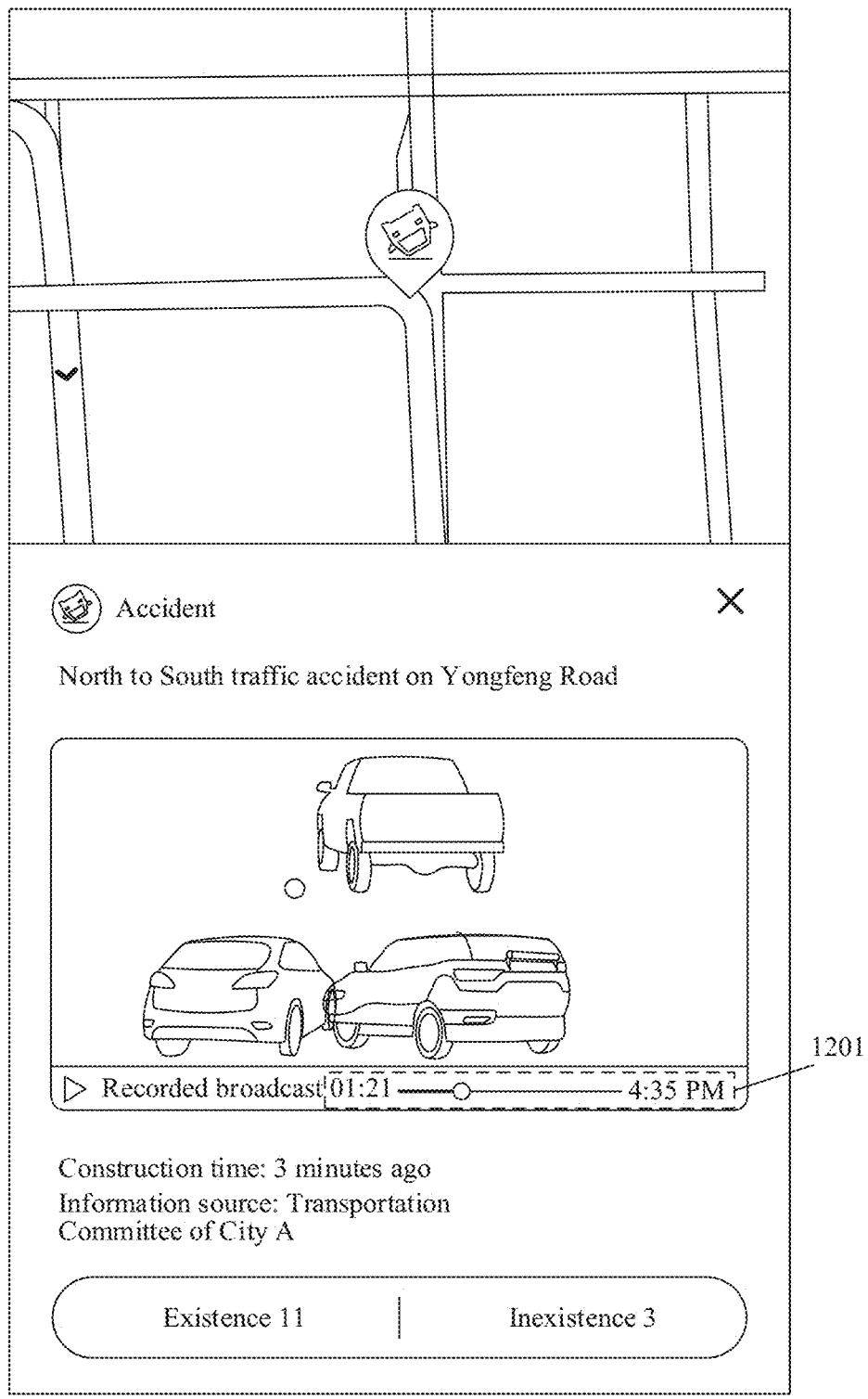
FIG. 12 is a schematic diagram of an interface for playing a recorded video provided by an embodiment of this application.

In the embodiment of this application, a video control bar supports the following operations: a) pause/play (as shown in FIG. 10, a pause/play control 1003 is displayed); b) if it is a video clip, a playing progress is supported to move, and as shown in FIG. 12, a current progress and a total duration are outputted in a progress bar 1201; and c) if it is live broadcast, dragging is not supported, and only the current progress is described in the progress.

In the video playing method in the map provided by the embodiments of this application, when the home page of the map client and the point events in navigation provide data support on a data side, the video playing region is supported, a point event live broadcast video or recorded video is played through the video playing region, the richness of the information provided by the electronic map can be enriched, the users can intuitively and truly know the event information and event progress, so that the competitiveness of the electronic map APP is enhanced, with more and more relevant partners, data support will also increase, and scale effect will continue to promote the experience improvement of real-time data of the electronic map.

The following continues to explain that implementation of a video playing apparatus 454 in a map provided by an embodiment of this application is an exemplary structure of a software module. In some embodiments, as shown in FIG. 3A, the software module in the video playing apparatus 454 in the map stored in a memory 450 may include: a first transmitting module 4541, configured to transmit, in response to an interactive operation of a target control in a map display interface, a first acquisition request, the first acquisition request being used for acquiring target video data, and the target video data corresponding to the target control; a first acquisition module 4542, configured to receive response information for the first acquisition request, and acquire the target video data based on the response information; and a first displaying module 4543, configured to display a video window on the map display interface, the video window being used for playing the target video data.

In some embodiments, the first acquisition module is further configured to: acquire a target video playing address based on the response information; and acquire the target video data according to the target video playing address.

In some embodiments, the first acquisition module is further configured to: acquire valid time information of the target video playing address; determine that the target video playing address is in a valid state based on the valid time information and current time: and acquire the target video data from the target video playing address.

In some embodiments, the first acquisition module is further configured to: acquire a target storage address included in the response information; and acquire the target video data from a local storage space of a terminal according to the target storage address.

In some embodiments, the apparatus further includes: a first loading module, configured to load a first floating layer in a preset region of the map display interface according to a first preset transparency, and present the video window on the first floating layer; a video playing module, configured to play the target video data in the video window in one of the following ways: automatically playing the target video data in the video window after displaying the video window: playing, in response to a video playing instruction, the target video data in the video window; and controlling playing of a target video in the video window according to a network connection state of a terminal, where the map display interface runs on the terminal.

In some embodiments, the video playing module is further configured to: automatically play, in accordance with a determination that the terminal is in a WLAN connection state, the target video data in the video window; or, automatically play, in accordance with a determination that the terminal is in a cellular connection state or switched to the cellular connection state, and a video automatic playing condition is met, the target video data in the video window; or, display, in accordance with a determination that the terminal is in the cellular connection state or switched to the cellular connection state, and the video automatic playing condition is not met, first prompt information in the video window, play, in response to a confirmation operation of the first prompt information, the target video data in the video window, or close the video window in response to that the confirmation operation is not received within a specified time.

In some embodiments, the video playing module is further configured to: load a second floating layer in the video window according to a second preset transparency: and display the first prompt information in the second floating layer, the first prompt information being used for prompting to choose to confirm playing video data or choose not to remind to play the video data within a preset duration, and the second floating layer being provided with a confirmation control for confirming playing and a choose control for not reminding within the preset duration.

In some embodiments, the apparatus further includes: a second acquisition module, configured to acquire a target image corresponding to the target control; and a second displaying module, configured to display an image window on the map display interface, the image window being used for displaying the target image.

In some embodiments, the apparatus further includes: a third acquisition module, configured to acquire a type of the target video data, the type being one of live broadcast data and recorded broadcast data: and a third displaying module, configured to display a play controlling control of the target video data according to the type of the target video data.

In some embodiments, the third displaying module is further configured to; display, in accordance with a determination that the type is the live broadcast data, a switching key of the target video data, the switching key being used for switching the target video data from a playing state to a paused state, or from the paused state to the playing state; and at least display, in accordance with a determination that the type is the recorded broadcast data, a progress bar control of the target video data, the progress bar control being used for controlling a playing progress of the target video data.

In some embodiments, the apparatus further includes: a second receiving module, configured to receive a first operation for displaying traffic live: and a fourth display module, configured to display a traffic live map in response to the first operation, the traffic live map including at least one control that can respond to the interactive operation, the at least one control corresponding to video data of location points in the traffic live map, and the at least one control including the target control.

In some embodiments, the apparatus further includes: a third receiving module, configured to receive a second operation for path planning, and acquiring departure information and destination information based on the second operation: a first determining module, configured to determine a travel route by using the departure information and the destination information; a fourth acquisition module, configured to acquire, in accordance with a determination that the terminal is in the WLAN connection state, video data corresponding to at least one location point included in the travel route; and a storage module, configured to store the video data.

In some embodiments, the apparatus further includes: a fifth displaying module, configured to display confirm information and confirmation control corresponding to the target video data in the video window, the confirmation control including a first control for determining that an event corresponding to the target video data exists and a second control for determining that the event corresponding to the target video data does not exist, and the confirm information including first confirm data corresponding to the first control and second confirm data corresponding to the second control; a fifth acquisition module, configured to acquire location information of the terminal itself; a sixth displaying module, configured to present, in accordance with a determination that the location points corresponding to the location information and the target video data meet a proximity condition, second prompt information for confirming whether the event corresponding to the target video data occurs: a first updating module, configured to update, in accordance with a determination that a third operation for the first control is received, the first confirm data based on the third operation; and a second updating module, configured to update, in accordance with a determination that a fourth operation for the second control is received, the second confirm data based on the fourth operation.

Here, it needs to be indicated that The description of the foregoing video playing apparatus in a map embodiment is similar to the description of the foregoing method, and has same beneficial effects as the method embodiments. A person skilled in the art should refer to the description of the method embodiment of this application for understanding of the technical details that are not disclosed in the video playing apparatus in a map embodiment of this application.

Figure 3B:
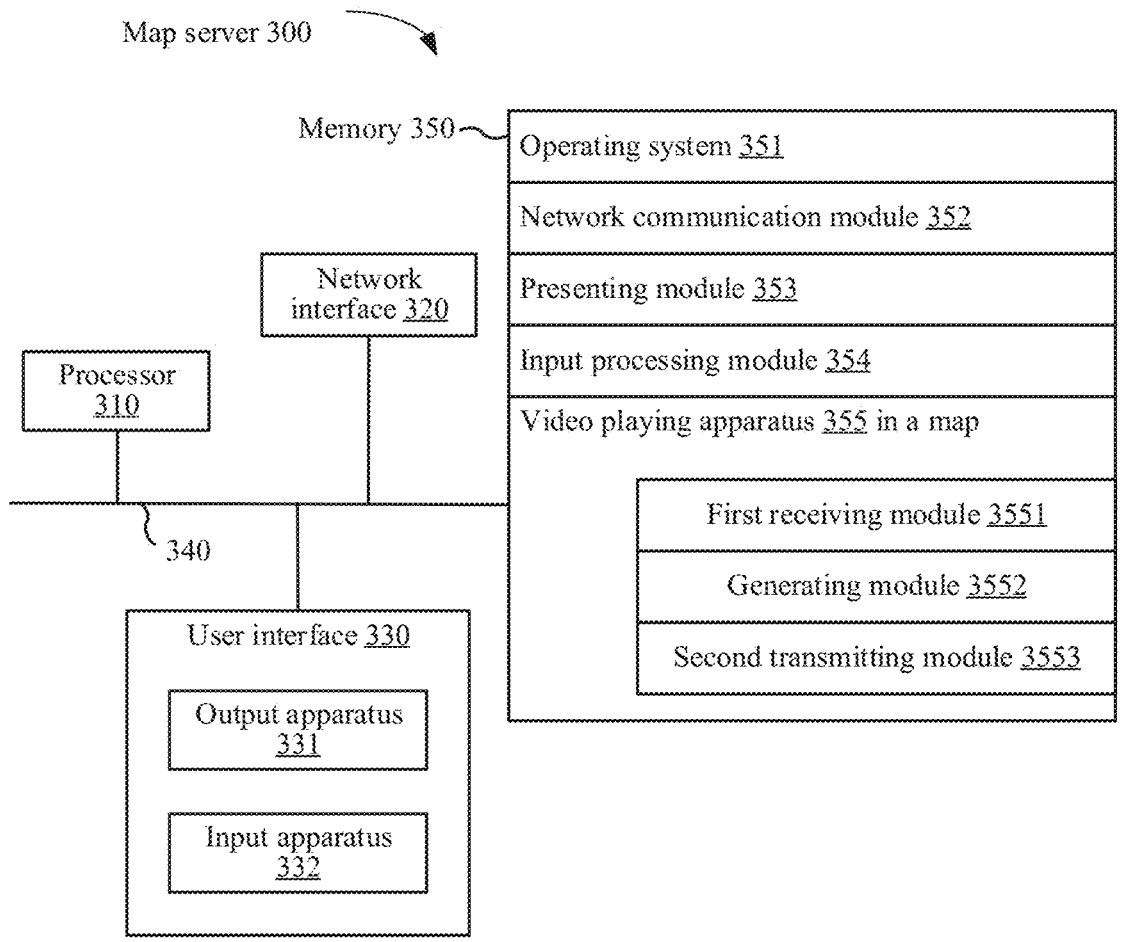
FIG. 3B is a schematic structural diagram of a map server provided by an embodiment of this application.

Referring to FIG. 3B, FIG. 3B is a schematic structural diagram of a map server 300 provided by an embodiment of this application, the map server 300 shown in FIG. 3B includes: at least one processor 310, a memory 350, at least one network interface 320, and a user interface 330. Components in the map server 300 are coupled together by using a bus system 340, the memory 350 may store data to support various operations. Examples of the data include a program, a module, and a data structure, or a subset or a superset thereof. The memory 350 further includes: an operating system 351, a network communication module 352, a presenting module 353, an input processing module 354 and a video playing apparatus 355 in the map provided by the embodiment of this application. As shown in FIG. 3B, a software module in the video processing apparatus 355 in the map may include: a first receiving module 3551, configured to receive a first acquisition request, the first acquisition request being used for acquiring target video data, and the first acquisition request carrying location information: a generating module 3552, configured to generate verification information in response to the first acquisition request; and a second transmitting module 3553, configured to transmit response information carrying the verification information to a terminal, so that the terminal acquires the target video data based on the verification information.

In some embodiments, the apparatus further includes: a fifth receiving module, configured to receive a second acquisition request of a video playing address transmitted by the terminal, the second acquisition request carrying to-be-verified information corresponding to the verification information and the location information; a third transmitting module, configured to transmit, in accordance with a determination that the verification information determines that verification of the to-be-verified information has passed, a third acquisition request of the video playing address to a video server; and a sixth receiving module, configured to receive an acquisition response transmitted by the video server, and transmitting the acquisition response to the terminal, the acquisition response carrying the video playing address.

In some embodiments, the apparatus further includes: a sixth acquisition module, configured to acquire road network data corresponding to an electronic map: a seventh acquisition module, configured to acquire, in accordance with a determination that a preset event is determined to occur based on the road network data, location information and time information corresponding to the preset event; and a fourth transmitting module, configured to transmit the location information and the time information to the video server, so that the video server acquires video data corresponding to the preset event based on the location information and the time information.

Here, it needs to be indicated that The description of the foregoing video playing apparatus in a map embodiment is similar to the description of the foregoing method, and has same beneficial effects as the method embodiments. A person skilled in the art should refer to the description of the method embodiment of this application for understanding of the technical details that are not disclosed in the video playing apparatus in a map embodiment of this application.

An embodiment of this application provides a computer program product or a computer program, the computer program product or the computer program including computer instructions, the computer instructions being stored in a computer-readable storage. A processor of a computer device reads the computer instructions from the computer-readable storage medium, and executes the computer instructions, to cause the computer device to perform the video playing method in a map in the embodiment of this application.

An embodiment of this application provides a computer-readable storage medium storing an executable instruction. When the executable instruction is executed by a processor, the processor is caused to perform the method in the embodiments of this application, such as the methods shown in FIG. 4, FIG. 5, and FIG. 6.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A video playing method on a map performed by an electronic device, the method comprising:
    transmitting, in response to detecting a user input on a target control in a map display interface, a first acquisition request, the first acquisition request being used for acquiring target video data corresponding to the target control;
    receiving response information for the first acquisition request, and acquiring the target video data based on the response information; and
    displaying a video window on the map display interface, the video window being used for playing the target video data, further including:
        loading a first floating layer in a preset region of the map display interface on a terminal according to a first preset transparency, and presenting the video window on the first floating layer; and
        the playing the target video data in the video window comprises one or more of:
        automatically playing the target video data in the video window;
        playing, in response to a video playing instruction, the target video data in the video window; and
        controlling playing of the target video data in the video window based on a network connection state of a terminal.

2. The method according to claim 1, wherein acquiring the target video data comprises:
    acquiring a target video playing address based on the response information; and
    acquiring the target video data according to the target video playing address.

3. The method according to claim 2, wherein acquiring the target video data based on the target video playing address comprises:
    acquiring valid time information of the target video playing address; and
    in accordance with a determination that the target video playing address is in a valid state based on the valid time information and current time:
    acquiring the target video data from the target video playing address.

4. The method according to claim 3, wherein the valid time information comprises an effective time and an invalid time, and the determination that the target video playing address is in the valid state comprises:
    in accordance with a determination that the current time is between the effective time and the invalid time, determining that the target video playing address is in the valid state.

5. The method according to claim 1, wherein acquiring the target video data comprises:
    acquiring a target storage address included in the response information; and
    acquiring the target video data from a local storage space of a terminal according to the target storage address.

6. The method according to claim 1, wherein controlling playing of the target video data comprises:
    in accordance with a determination that the terminal is in a WLAN connection state, automatically playing the target video data in the video window; or,
    in accordance with a determination that a video automatic playing condition is met, automatically playing the target video data in the video window; and
    in accordance with a determination that the video automatic playing condition is not met:
        displaying first prompt information in the video window;
        in response to detecting a confirmation operation of the first prompt information, playing the target video data in the video window; and in response to not detecting the confirmation operation within a specified time, closing the video window.

7. The method according to claim 6, wherein displaying first prompt information in the video window comprises:
loading a second floating layer in the video window according to a second preset transparency; and
displaying the first prompt information in the second floating layer, the second floating layer having a confirmation control for confirming playing video data and a selection control for ceasing a reminder to play the video data within a preset duration.

8. The method according to claim 6, wherein after closing the video window, the method further comprises:
acquiring a target image corresponding to the target control; and
displaying an image window of the target image on the map display interface.

9. The method according to claim 1, further comprising:
displaying a play control of the target video data according to whether the target video data is live broadcast data or recorded broadcast data.

10. The method according to claim 9, wherein displaying the play control comprises:
in accordance with a determination that the target video data is live broadcast data, displaying a switching key for switching the target video data from a playing state to a paused state, or from the paused state to the playing state; and
in accordance with a determination that the target video data is recorded broadcast data, displaying a progress bar control of the target video data for controlling a playing progress of the target video data.

11. The method according to claim 1, further comprising:
receiving a user input for displaying traffic live; and
displaying a traffic live map in response to the user input, the traffic live map comprising at least one control responsive to user input, the at least one control corresponding to video data of location points in the traffic live map, and the at least one control comprising the target control.

12. The method according to claim 1, further comprising:
acquiring departure information and destination information in response to receiving user input for path planning;
determining a travel route using the departure information and the destination information;
in accordance with a determination that a terminal is in a WLAN connection state, acquiring video data corresponding to at least one location point in the travel route; and
storing the video data.

13. The method according to claim 1, further comprising:
displaying confirmation information and a confirmation control corresponding to the target video data in the video window, the confirmation control comprising a first control and a second control;
acquiring a current location of a terminal;
in accordance with a determination that location points corresponding to the current location and the target video data meet a proximity condition, presenting second prompt information for confirming existence of the preset event corresponding to the target video data;
in accordance with a determination that a third operation for the first control indicating the existence of the preset event is received, updating first confirmation data based on the third operation; and
in accordance with a determination that a fourth operation for the second control indicating non-existence of the preset event is received, updating second confirmation data based on the fourth operation.

14. The method according to claim 1,
wherein the first acquisition request includes location information and
the response information includes verification information, and the target video data is acquired based on the verification information.

15. The method according to claim 14, further comprising:
transmitting, by a server receiving the first acquisition request, a second acquisition request of a target video playing address to a video server; and
receiving an acquisition response transmitted by the video server, and transmitting the acquisition response to a terminal, the acquisition response carrying the target video playing address.

16. The method according to claim 15, further comprising:
acquiring road network data corresponding to an electronic map;
in accordance with a determination that the preset event is determined to have occurred based on the road network data, acquiring location information and time information corresponding to the preset event; and
transmitting the location information and the time information to the video server for acquiring video data corresponding to the preset event based on the location information and the time information.

17. An electronic device, comprising:
one or more processors; and
memory storing one or more programs, the one or more programs comprising instructions that, when executed by the one or more processors, cause the one or more processors to perform operations comprising:
transmitting, in response to detecting a user input on a target control in a map display interface, a first acquisition request, the first acquisition request being used for acquiring target video data corresponding to the target control;
receiving response information for the first acquisition request, and acquiring the target video data based on the response information; and
displaying a video window on the map display interface, the video window being used for playing the target video data, further including:
loading a first floating layer in a preset region of the map display interface on a terminal according to a first preset transparency, and presenting the video window on the first floating layer; and
the playing the target video data in the video window comprises one or more of:
automatically playing the target video data in the video window;
playing, in response to a video playing instruction, the target video data in the video window; and
controlling playing of the target video data in the video window based on a network connection state of a terminal.

18. The electronic device of claim 17, wherein acquiring the target video data comprises:
acquiring a target video playing address based on the response information; and
acquiring the target video data according to the target video playing address.

19. A non-transitory computer-readable storage medium, storing a computer program, the computer program, when executed by one or more processors of an electronic device, cause the one or more processors to perform operations comprising:

transmitting, in response to detecting a user input on a target control in a map display interface, a first acquisition request, the first acquisition request being used for acquiring target video data corresponding to the target control;

receiving response information for the first acquisition request, and acquiring the target video data based on the response information; and displaying a video window on the map display interface, the video window being used for playing the target video data, further including:

loading a first floating layer in a preset region of the map display interface on a terminal according to a first preset transparency, and presenting the video window on the first floating layer; and the playing the target video data in the video window comprises one or more of:

automatically playing the target video data in the video window;

playing, in response to a video playing instruction, the target video data in the video window; and controlling playing of the target video data in the video window based on a network connection state of a terminal.

* * * * *